US012204268B2

(12) United States Patent
Watanabe

(10) Patent No.: US 12,204,268 B2
(45) Date of Patent: Jan. 21, 2025

(54) PROCESSING SYSTEM FOR EJECTING RECORDING MEDIUM TO SPECIFIED EJECTION DESTINATION

(71) Applicant: Takayuki Watanabe, Kanagawa (JP)

(72) Inventor: Takayuki Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 232 days.

(21) Appl. No.: 17/941,027

(22) Filed: Sep. 9, 2022

(65) Prior Publication Data

US 2023/0090948 A1 Mar. 23, 2023

(30) Foreign Application Priority Data

Sep. 17, 2021 (JP) ................................ 2021-152070
Aug. 22, 2022 (JP) ................................ 2022-131579

(51) Int. Cl.
*G03G 15/00* (2006.01)
*B41J 11/00* (2006.01)
*B41J 11/42* (2006.01)

(52) U.S. Cl.
CPC ............ *G03G 15/70* (2013.01); *B41J 11/006* (2013.01); *B41J 11/42* (2013.01); *G03G 15/6552* (2013.01)

(58) Field of Classification Search
CPC ................. G03G 15/70; G03G 15/6552; B41J 11/006; B41J 11/42
See application file for complete search history.

(56) References Cited

U.S. PATENT DOCUMENTS

| | | | | |
|---|---|---|---|---|
| 2007/0057445 A1* | 3/2007 | Miyake | B65H 7/14 | 271/256 |
| 2013/0161902 A1* | 6/2013 | Onodera | B65H 3/44 | 271/264 |
| 2013/0163032 A1* | 6/2013 | Hamano | G06F 11/076 | 358/1.14 |
| 2014/0241737 A1 | 8/2014 | Shirasaka | | |
| 2016/0318731 A1* | 11/2016 | Kowase | B65H 29/60 | |
| 2017/0008724 A1 | 1/2017 | Satsukawa | | |
| 2017/0308024 A1* | 10/2017 | Zhu | G03G 15/70 | |
| 2018/0044129 A1* | 2/2018 | Ando | G03G 15/6538 | |
| 2018/0210389 A1* | 7/2018 | Konishi | G06F 3/1234 | |
| 2019/0163113 A1* | 5/2019 | Konishi | G03G 15/70 | |

(Continued)

FOREIGN PATENT DOCUMENTS

JP 2017-019172 1/2017

*Primary Examiner* — David H Banh
(74) *Attorney, Agent, or Firm* — XSENSUS LLP

(57) ABSTRACT

A processing system includes a processing apparatus, a feeding apparatus, an ejection apparatus, and circuitry. The processing apparatus includes a processing device to execute a process on each of objects including a first object and a second object. The feeding apparatus feeds the objects to the processing apparatus. The ejection apparatus ejects the objects sent from the processing apparatus. The ejection apparatus includes an ejection purge portion to receive the second object traveling in the ejection apparatus. The circuitry sets whether to permit ejection of the second object not jammed to the ejection purge portion in case of a jam of the first object in the processing system. The circuitry causes the second object to be ejected to the set ejection purge portion, in response to detection of the jam of the first object.

16 Claims, 15 Drawing Sheets

(56) References Cited

U.S. PATENT DOCUMENTS

| | | | | |
|---|---|---|---|---|
| 2019/0212689 | A1* | 7/2019 | Matsui | G03G 15/70 |
| 2019/0283069 | A1* | 9/2019 | Nakagaki | B41J 11/0015 |
| 2021/0061607 | A1* | 3/2021 | Homma | G03G 15/6529 |
| 2021/0138807 | A1* | 5/2021 | Shimojima | B65H 29/125 |
| 2021/0382669 | A1* | 12/2021 | Kimura | B41J 29/38 |

* cited by examiner

PROCESSING SYSTEM FOR EJECTING RECORDING MEDIUM TO SPECIFIED EJECTION DESTINATION

CROSS-REFERENCE TO RELATED APPLICATIONS

This patent application is based on and claims priority pursuant to 35 U.S.C. § 119(a) to Japanese Patent Application Nos. 2021-152070, filed on Sep. 17, 2021, and 2022-131579, filed on Aug. 22, 2022, in the Japan Patent Office, the entire disclosure of each of which is hereby incorporated by reference herein.

BACKGROUND

Technical Field

Embodiments of the present disclosure relate to a processing system for ejecting a recording medium to a specified ejection destination.

Background Art

Various types of image forming apparatuses are known to include an operation unit to receive various operations input by a user via an operation screen, a conveyance device to convey a recording medium conveyed along a conveyance passage directed to a plurality of ejection destinations, to a selected one of the plurality of ejection destinations, an image forming device to form an image on the recording medium being conveyed in the conveyance passage, and a controller to specify a selected ejection destination of the plurality of the ejection destinations based on the user operation received by the operation unit to cause the conveyance device to convey the recording medium to the selected ejection destination. A known image forming apparatus discloses a technique in which, when a jam is detected in the conveyance passage via the conveyance device, the controller causes the conveyance device to stop conveyance of the recording medium and the operation unit to display a selection screen for selecting a purge destination from the plurality of ejection destinations, so that a user may select the purge destination on the selection screen. In response to reception of the selected purge destination via the operation unit, the controller specifies the recording medium to be ejected to the purge destination among the recording media held in the conveyance passage and causes the conveyance device to eject the recording media to be conveyed to the selected purge destination.

SUMMARY

Embodiments of the present disclosure described herein provide a novel processing system that includes a processing apparatus, a feeding apparatus, an ejection apparatus, and circuitry. The processing apparatus includes a processing device to execute a process on each of objects. The objects includes a first object and a second object traveling upstream or downstream from the first object in a conveyance direction of the objects. The feeding apparatus feeds the objects to the processing apparatus. The feeding apparatus is disposed upstream from the processing apparatus in the conveyance direction of the objects. The ejection apparatus ejects the objects sent from the processing apparatus. The ejection apparatus is disposed downstream from the processing apparatus in the conveyance direction of the objects.

The ejection apparatus includes an ejection purge portion to receive the second object traveling in the ejection apparatus. The circuitry sets whether to permit ejection of the second object being not jammed to the ejection purge portion in case of a jam of the first object in the processing system. The circuitry causes the second object to be ejected to the set ejection purge portion, in response to detection of the jam of the first object.

BRIEF DESCRIPTION OF THE SEVERAL VIEWS OF THE DRAWINGS

Exemplary embodiments of this disclosure will be described in detail based on the following figures, wherein.

FIG. t is a schematic diagram illustrating an overall configuration of a processing system according to an embodiment of the present disclosure.

Figure 1:
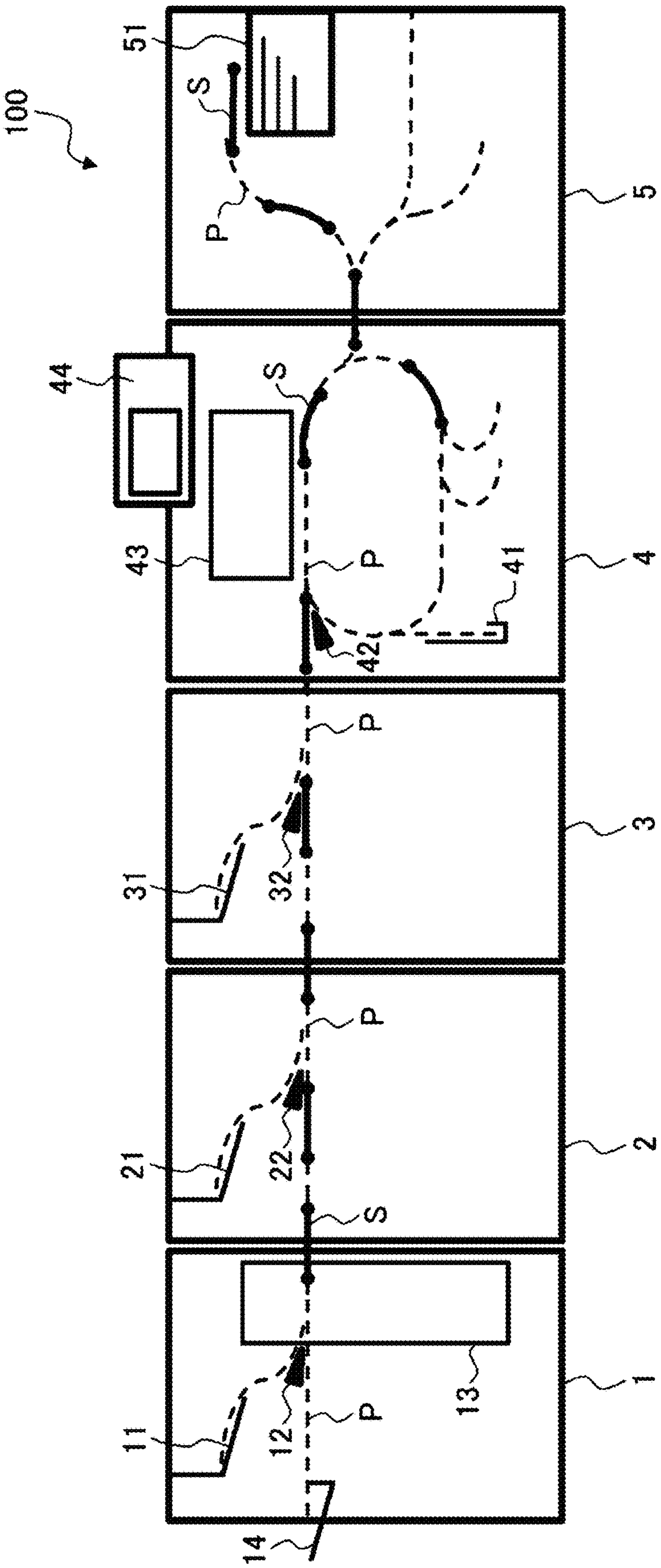

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures, it will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of a processing system according to an embodiment of the present disclosure, with reference to drawings. Note that identical parts or equivalents are given identical reference numerals and redundant descriptions are summarized or omitted accordingly.

Embodiments of the present disclosure are described below with reference to the drawings.

FIG. 1 is a schematic diagram illustrating an overall configuration of a processing system according to an embodiment of the present disclosure.

A description is given of a configuration of an image forming system as a processing system according to the present embodiment.

The image forming system 100 includes a recording medium feeding apparatus 5, an image forming apparatus 4, a post-processing apparatus 1, a post-processing apparatus 2, and a post-processing apparatus 3. The image forming apparatus 4 includes an image forming device 43 and performs a desired process on a sheet-shaped recording medium S (indicated by a thick line) as an example of an object. The desired process corresponds to an image forming process in the present embodiment. The image forming process performed by the image forming device 43 may employ various types of image forming methods including an electrophotographic image forming method, an inkjet image forming method, and a thermal transfer method. When the image forming apparatus 4 employs the inkjet image forming method, the image forming device 43 includes a recording head (or recording heads) that discharges liquid onto the recording medium S to form an image. The recording head may be a serial type in which droplets are discharged while scanning in a direction orthogonal to the conveyance direction of the recording medium S or a line type in which the position of the recording head is fixed.

Further, the image forming apparatus 4 includes a conveyance passage changing gate 42. The conveyance passage changing gate 42 is rotatable about the conveyance passage P (indicated by a broken line) to change between a first position at which the recording medium S is guided to the post-processing apparatus 3 and a second position at which the recording medium S is guided to a tray 41 disposed inside the image forming apparatus 4. The image forming apparatus 4 further includes a control panel 44. The control panel 44 includes, for example, a touch panel display. The control panel 44 displays various information such as a cursor, keyboard, menu, window, character or image, and the processing results and accepts inputs from users. In the present embodiment, the control panel 44 displays various information and the processing results and accepts inputs from users, of the overall image forming system 100 including not only the image forming apparatus 4 but also the recording medium feeding apparatus 5, the post-processing apparatus 1, the post-processing apparatus 2, and the post-processing apparatus 3. In the present embodiment, the image forming apparatus 4 is an example of a processing apparatus and the image forming device 43 is an example of a processing device. The tray 41 is an example of a processing apparatus purge portion (processing purge portion) and the conveyance passage changing gate 42 is an example of an ejection destination changer.

The recording medium feeding apparatus 5 is disposed at the prior stage (right side in FIG. 1) of the image forming apparatus 4. In other words, the recording medium feeding apparatus 5 is disposed upstream from the image forming apparatus 4 in the conveyance direction of the recording medium S. The recording medium feeding apparatus 5 includes a container 51 that accommodates the recording media S. The recording medium S that is fed from the container 51 of the recording medium feeding apparatus 5 is conveyed to the image forming apparatus 4 via the conveyance passage P. The recording medium feeding apparatus 5 is an example of a feeding apparatus.

The post-processing apparatus 3, the post-processing apparatus 2, and the post-processing apparatus 1 are disposed at the subsequent stages (left side in FIG. 1) of the image forming apparatus 4 in this order. The post-processing apparatus 3, the post-processing apparatus 2, and the post-processing apparatus 1 include an ejection tray 31, an ejection tray 21, and an ejection tray 11, respectively, and a conveyance passage changing gate 32, a conveyance passage changing gate 22, and a conveyance passage changing gate 12, respectively. The conveyance passage changing gate 32 is rotatable about the conveyance passage P to change between a position at which the recording medium S is guided to the post-processing apparatus at the subsequent stage and another position at which the recording medium S is guided to the ejection tray 31 attached to the post-processing apparatus 3. The conveyance passage changing gate 22 is rotatable about the conveyance passage P to change between a position at which the recording medium S is guided to the post-processing apparatus at the subsequent stage and another position at which the recording medium S is guided to the ejection tray 21 attached to the post-processing apparatus 2. The conveyance passage changing gate 12 of the post-processing apparatus 1 disposed at the extreme-downstream stage in the conveyance direction of the recording medium. The conveyance passage changing gate 12 is rotatable about the conveyance passage P to change between a position at which the recording medium S is guided to the ejection tray 14 attached to the post-processing apparatus 1 and another position at which the recording medium S is guided to the ejection tray 11 attached to the post-processing apparatus 1. The post-processing apparatus 1 further includes a post-processing device 13 that performs post-processing operations such as folding, punching, and stapling, on the recording medium S conveyed from the post-processing apparatus 2. After the post-processing operations, the post-processing apparatus 1 ejects the recording medium S to the ejection tray 11 or the ejection tray 14. Each of the post-processing apparatus 1, the post-processing apparatus 2, and the post-processing apparatus 3 is an example of an ejection apparatus. Each of the ejection trays 11 and 14 is an example of an ejection apparatus purge portion (ejection purge portion).

The image forming system 100 has a function that ejection destinations are preliminarily set for ejecting the recording media traveling upstream and downstream from a jammed recording medium in the conveyance direction of the recording medium in case of a jam of a recording medium in the image forming system 100. The ejection destinations may be input (instructed) by a user via the control panel 44, in other words, the user preliminarily inputs, via the control panel 44, whether to permit ejection of the recording media having no jam to the tray 41 and the ejection trays 11, 14, 21, and 31 when a recording medium is jammed in the image forming system 100. As a result, the recording media not jammed are automatically conveyed to the ejection tray set by a controller described below according to the input by the user when a recording medium is jammed in the image forming system 100. As a result, the removal time of the jammed recording medium is shortened.

Figure 2:
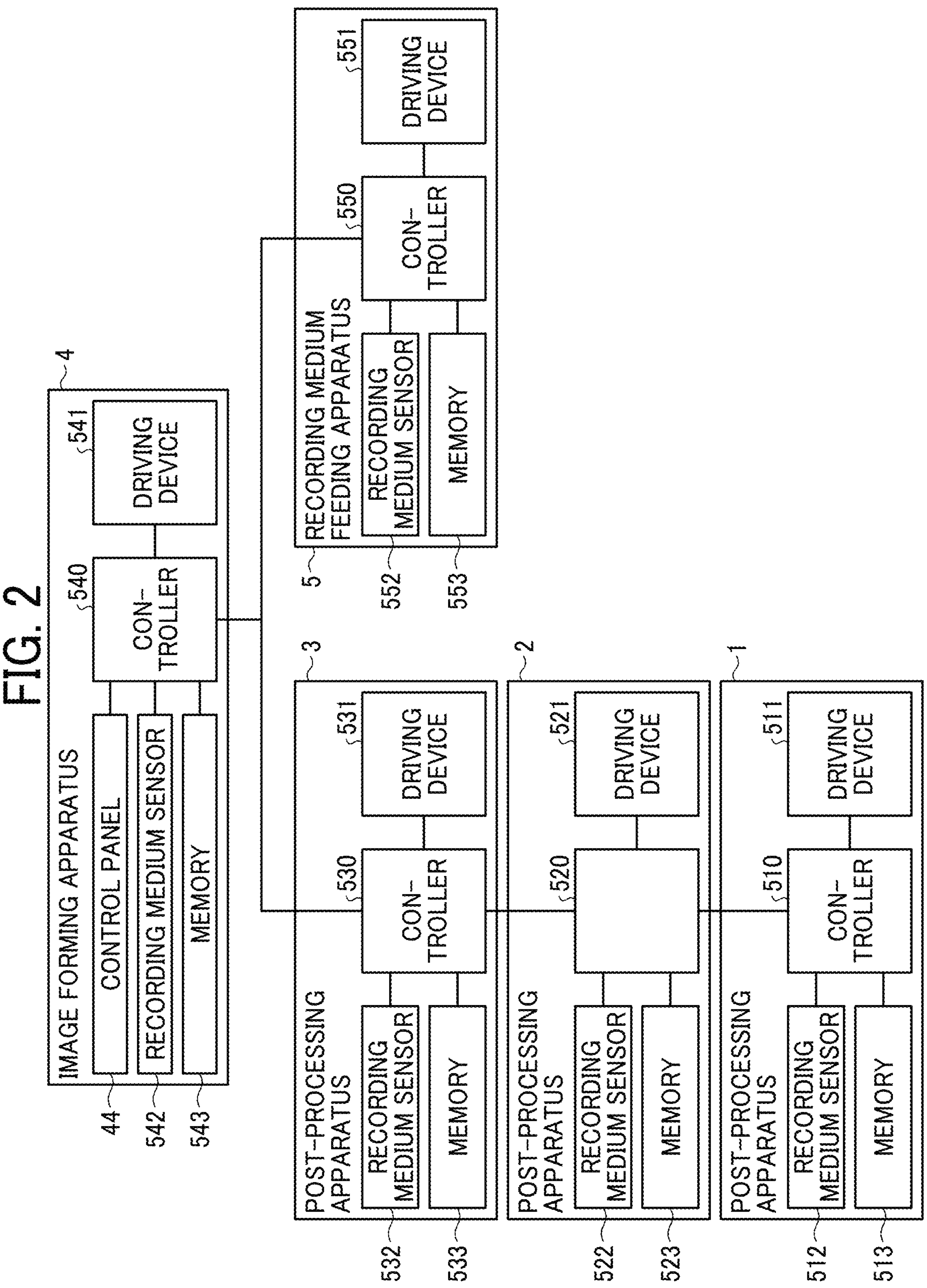
FIG. 2 is a schematic block diagram illustrating the processing system according to an embodiment of the present disclosure.

FIG. 2 is a schematic block diagram illustrating the processing system according to an embodiment of the present disclosure.

The image forming apparatus 4 is an example of a processing apparatus, and includes a controller 540, a drive device 541, a recording medium sensor 542, a memory 543, and the control panel 44.

When the controller 540 receives an instruction to start the image forming process from the control panel 44 (or an external terminal), the controller 540 starts driving the drive device 541. Further, the controller 540 receives a signal from the recording medium sensor 542 and executes control of the drive device 541 and display of information about the conveyance state to the control panel 44, based on the received signal.

The controller 540 causes the information accepted by the control panel 44 to be stored in the memory 543, so that the controller 540 causes the image forming device 4 to perform various settings. For example, when the controller 540 receives the setting information accepted by the control panel 44 (for example, the tray information about the ejection of recording media at the occurrence of the jam), from the control panel 44, the controller 540 causes the received information to be stored in the memory 543. By so doing, the setting according to the setting information (for example, the setting of the sheet discharge tray) is performed.

When the controller 540 receives the setting information accepted by the control panel 44, the controller 540 sends the received information to each controller of post-processing apparatuses 1, 2, and 3 and the recording medium feeding apparatus 5.

The drive device 541 controls the image forming device 43 and conveyance of the recording media S, as illustrated in FIG. 1, and executes the image forming process on the recording medium S. The recording medium sensor 542 is disposed at an appropriate position in the conveyance passage P of the image forming apparatus 4 to detect passing and stopping of the recording medium S and send the detection signal to the controller 540.

The memory 543 stores setting information that the tray 41 of the image forming apparatus 4 receives the recording media not jammed.

The control panel 44 includes, for example, a touch panel display. The control panel 44 displays various information such as a cursor, keyboard, menu, window, character or image, and the processing results and accepts inputs from users.

Next, a description is given of the configuration and operations of the post-processing apparatus 1, the post-processing apparatus 2, and the post-processing apparatus 1, each being an example of an ejection apparatus. The post-processing apparatus 3 includes a controller 530, a drive device 531, a recording medium sensor 532, and a memory 533.

When the controller 530 receives an instruction from the controller 540 of the image forming apparatus 4, the controller 530 controls the driving of the drive device 531 based on the instruction. Further, the controller 530 receives a signal from the recording medium sensor 532 and executes control of the drive device 531 and sending of information about the conveyance state to the controller 540 of the image forming apparatus 4, based on the received signal.

When the controller 530 receives the setting information from the controller 540, the controller 530 causes the setting information to be stored in the memory 533. By so doing, the controller 530 performs various types of settings in the post-processing apparatus 3.

The drive device 531 controls conveyance of the recording medium S in the post-processing apparatus 3. The recording medium sensor 532 is disposed at an appropriate position in the conveyance passage P of the post-processing apparatus 3 to detect passing and stopping of the recording medium S and send the detection signal to the controller 530.

The memory 533 stores setting information that the ejection tray 31 of the post-processing apparatus 3 receives the recording medium not jammed.

The post-processing apparatus 2 includes a controller 520, a drive device 521, a recording medium sensor 522, and a memory 523.

When the controller 520 receives an instruction from the controller 540 of the image forming apparatus 4 via the controller 530 of the post-processing apparatus 3, the controller 520 controls the driving of the drive device 521 based on the instruction. Further, the controller 520 receives a signal from the recording medium sensor 522, and executes, via the controller 530, control of the drive device 521 and sending of information about the conveyance state to the controller 540 of the image forming apparatus 4, based on the received signal.

When the controller 520 receives the setting information from the controller 540 via the controller 530 of the post-processing apparatus 3, the controller 520 causes the setting information to be stored in the memory 523, By so doing, the controller 520 performs various types of settings formed in the post-processing apparatus 2.

The drive device 521 controls conveyance of the recording medium S in the post-processing apparatus 2. The recording medium sensor 522 is disposed at an appropriate position in the conveyance passage P of the post-processing apparatus 2 to detect passing and stopping of the recording medium S and send the detection signal to the controller 520.

The memory 523 stores setting information that the ejection tray 21 of the post-processing apparatus 2 receives the recording medium not jammed.

The post-processing apparatus 1 includes a controller 510, a drive device 511, a recording medium sensor 512, and a memory 513.

When the controller 510 receives an instruction from the controller 540 of the image forming apparatus 4 via the controller 530 of the post-processing apparatus 3 and the controller 520 of the post-processing apparatus 2, the controller 510 controls the driving of the drive device 511 based on the instruction. Further, the controller 510 receives a signal from the recording medium sensor 512, and executes, via the controllers 520 and 530, control of the drive device 511 and sending of information about the conveyance state to the controller 540 of the image forming apparatus 4, based on the received signal.

When the controller 510 receives the setting information from the controller 540 via the controller 530 of the post-processing apparatus 3 and the controller 520 of the post-processing apparatus 2, the controller 510 causes the setting information to be stored in the memory 513. By so doing, the controller 510 performs various types of settings formed in the post-processing apparatus 1.

The drive device 511 controls conveyance of the recording medium S in the post-processing apparatus 1. The recording medium sensor 512 is disposed at an appropriate position in the conveyance passage P of the post-processing apparatus 1 to detect passing and stopping of the recording medium S and send the detection signal to the controller 510.

The memory 513 stores setting information that the ejection trays 11 and 14 of the post-processing apparatus 1 receive the recording media not jammed.

Next, a description is given of the configuration and operations of the recording medium feeding apparatus 5.

The recording medium feeding apparatus 5 is an example of a feeding apparatus. The recording medium feeding apparatus 5 includes a controller 550, a drive device 551, a recording medium sensor 552, and a memory 553.

When the controller 550 receives an instruction from the controller 540 of the image forming apparatus 4, the controller 550 controls the driving of the drive device 551 based on the instruction. Further, the controller 550 receives a signal from the recording medium sensor 552 and executes control of the drive device 551 and sending of information about the conveyance state to the controller 540 of the image forming apparatus 4, based on the received signal.

When the controller 550 receives the setting information from the controller 540, the controller 550 causes the setting information to be stored in the memory 553. By so doing, the controller 550 performs various types of settings in the recording medium feeding apparatus 5.

The drive device 551 controls conveyance of the recording medium S in the recording medium feeding apparatus 5. The recording medium sensor 552 is disposed at an appropriate position in the conveyance passage P of the recording medium feeding apparatus 5 to detect passing and stopping of the recording medium S and send the detection signal to the controller 550. Note that the recording medium feeding apparatus 5 may include an ejection tray to which the recording medium S that is not jammed is ejected. In such a case, the recording medium feeding apparatus 5 may include the memory 553, so that the setting information that the ejection tray receives the recording medium not jammed is stored in the memory 553.

In the above-described configuration, in the normal state, in other words, when no jam occurs in the image forming system 100, the post-processing apparatus 1, the post-processing apparatus 2, and the post-processing apparatus 3 are controlled so that the recording medium S on which the image forming process has been performed is ejected to any of the ejection trays 11, 14, 21, and 31 set by the user with the control panel 44.

When a jam occurs in the image forming apparatus 4, the post-processing apparatus 1, the post-processing apparatus 2, and the post-processing apparatus 3 are controlled so that the recording media S in the post-processing apparatus 1, the post-processing apparatus 2, and the post-processing apparatus 3 are ejected to any of the ejection trays 11, 14, 21, and 31 to which the ejection of the recording medium is permitted, with the control panel 44, which is like the normal state. In this case, the controller 540 of the image forming apparatus 4 does not send instruction of the ejection destination to the controller 510 of the post-processing apparatus 1, the controller 520 of the post-processing apparatus 2, and the controller 530 of the post-processing apparatus 3, respectively, and the controller 510 of the post-processing apparatus 1, the controller 520 of the post-processing apparatus 2, and the controller 530 of the post-processing apparatus 3 continue the ejection operations.

Further, when a recording medium is jammed in the post-processing apparatus, the controller of the post-processing apparatus in which the recording medium is jammed sends information of occurrence of the jam, to the controller 540 of the image forming apparatus 4 at the occurrence of the jam. Further, when a recording medium is jammed in the post-processing apparatus 1, the controller 510 of the post-processing apparatus 1 sends the information to the controller 540 of the image forming apparatus 4 via the controller 520 of the post-processing apparatus 2 and the controller 530 of the post-processing apparatus 3.

Next, each of the controller 510, the controller 520, and the controller 530 determines whether each of the post-processing apparatus 1, the post-processing apparatus 2, and the post-processing apparatus 3 is available to eject (purge) the recording media in each apparatus. For example, each of the controller 510 of the post-processing apparatus 1, the controller 520 of the post-processing apparatus 2, and the controller 530 of the post-processing apparatus 3 are available to purge the recording media based on, for example, information of the detection signals of the recording medium sensors 512, 522, and 532 and setting information that each ejection tray in the post-processing apparatus 1, the post-processing apparatus 2, and the post-processing apparatus 3 is to which the ejection of the recording media not jammed is ejected. When it is determined that the post-processing apparatus 1, the post-processing apparatus 2, and the post-processing apparatus 3 are available to purge the recording media, the controller (i.e., any of the controllers 510, 520, and 530) of the post-processing apparatus (i.e., any of the post-processing apparatus 1, the post-processing apparatus 2, and the post-processing apparatus 3) including the ejection tray as an ejection destination of the recording media S controls the drive device (i.e., any of the drive devices 511, 521, and 531).

When the post-processing apparatus disposed downstream from a corresponding one of the post-processing apparatus 1, the post-processing apparatus 2, and the post-processing apparatus 3 in the conveyance direction of the recording medium is not available to purge recording media, the upstream post-processing apparatus from the post-processing apparatus not available to purge recording media is controlled to purge (eject) the recording media. For example, when the controller 510 of the post-processing apparatus 1 determines that the post-processing apparatus 1 is not available to purge recording media, the controller 510 transmits information indicating that the post-processing apparatus 1 is not available to purge recording media, to the controller 520 of the post-processing apparatus 2.

In response to receipt of the information indicating that purge (ejection) of the recording medium (or recording media) is not available from the post-processing apparatus 1, the controller 520 of the post-processing apparatus 2 determines whether the post-processing apparatus 2 is available to purge (eject) the recording media. When the controller 520 of the post-processing apparatus 2 determines that the post-processing apparatus 2 is available to purge recording media, the controller 520 controls the drive device 521 of the post-processing apparatus 2 to eject the recording media having no jam to the ejection tray 21 of the post-processing apparatus 2. When the controller 520 of the post-processing apparatus 2 determines that the post-processing apparatus 2 is not available to purge recording media, the controller 520 of the post-processing apparatus 2 transmits information indicating that the post-processing apparatus 2 is not available to purge recording media, to the controller 530 of the post-processing apparatus 3. In response to receipt of the information indicating that purge (ejection) of the recording medium (or recording media) is not available from the post-processing apparatus 2, the controller 530 of the post-processing apparatus 3 determines whether the post-processing apparatus 3 is available to purge (eject) the recording media.

When the controller 530 of the post-processing apparatus 3 determines that the post-processing apparatus 3 is available to purge recording media, the controller 530 controls the drive device 531 of the post-processing apparatus 3 to eject the recording media S having no jam to the ejection tray 31 of the post-processing apparatus 3. Note that, when the controller of the post-processing apparatus issues an ejection stop request while the recording medium S is being ejected in any one of the post-processing apparatus 1, the post-processing apparatus 2, and the post-processing apparatus 3, the controller 540 issues an ejection stop instruction to the overall image forming system 100. The ejection stop instruction is issued, for example, when the type of jam occurred in the image forming system 100 requires the shutdown of the overall image forming system 100 or when the jam occurs again while the recording medium is being purged and the purging operation turns to be unavailable.

Figure 3:
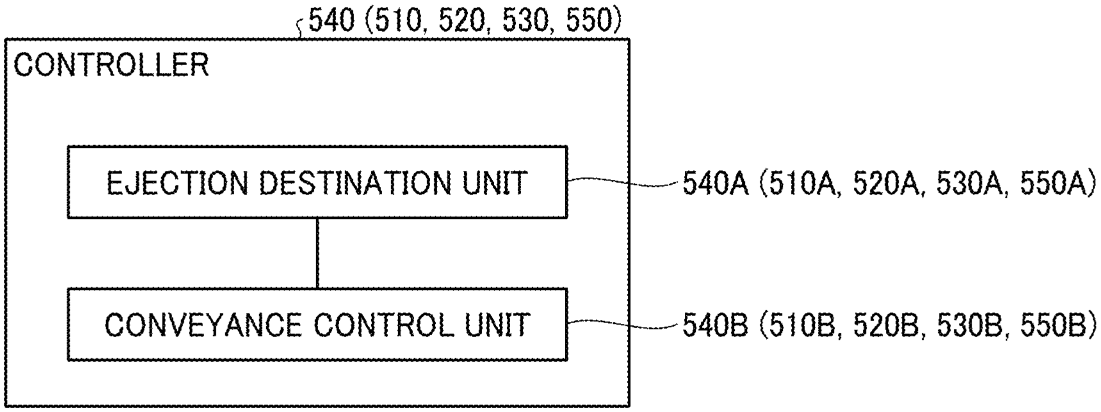
FIG. 3 is a block diagram illustrating a controller according to an embodiment of the present disclosure.

FIG. 3 is a block diagram illustrating the controllers 510, 520, 530, 540, and 550 according to an embodiment of the present disclosure.

The controllers 510, 520, 530, 540, and 550 of the post-processing apparatuses 1, 2, and 3, the image forming apparatus 4, and the recording medium feeding apparatus 5 respectively include destination setting units 510A, 520A, 530A, 540A, and 550A and conveyance control units 510B, 520B, 530B, 540B, and 550B.

The destination setting units 510A, 520A, 530A, 540A, and 550A causes the setting information input through the control panel 44 to be stored in the memories 513, 523, 533, 543, and 553 corresponding to the controllers 510, 520, 530, 540, and 550, so as to perform the setting to each of the post-processing apparatuses 1, 2, and 3, the image forming apparatus 4, and the recording medium feeding apparatus 5. For example, the setting information sent to (accepted by) the control panel 44 is input to the controller 540, and the setting information sent via a controller such as the controller 540 is input to the controllers 530, 520, 510, and 550.

The conveyance control units 510B, 520B, 530B, 540B, and 550B control conveyance of the recording medium S based on the setting information read from the memories 513, 523, 533, 543, and 553 corresponding to the controllers 510, 520, 530, 540, and 550 and the detection results of the recording medium sensors 521, 522, 532, 542, and 552. For example, when a jam is detected on a recording medium, a corresponding one or more of the conveyance control units 510B, 520B, 530B, 540B, and 550B causes the conveyable recording media that are not jammed to be ejected to the specified ejection tray.

Figure 4:
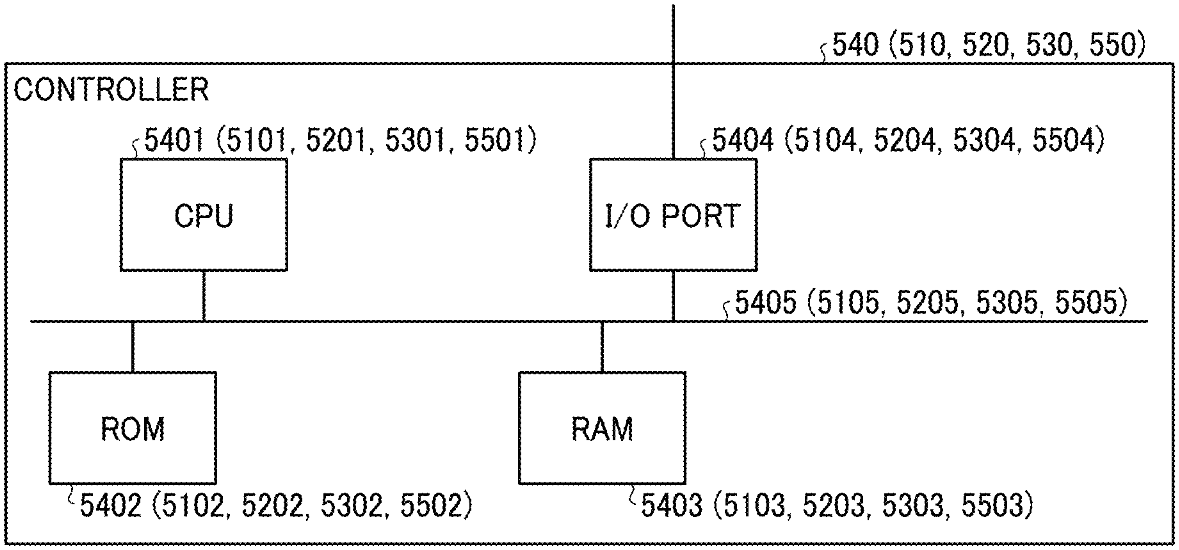
FIG. 4 is a hardware block diagram illustrating the controller according to an embodiment of the present disclosure.

FIG. 4 is a hardware block diagram illustrating of the controllers 510, 520, 530, 540, and 550 according to an embodiment of the present disclosure.

The controllers 510, 520, 530, 540, and 550 include respective central processing units (CPUs) 5101, 5201, 5301, 5401, and 5501, respective read only memories (ROMs) 5102, 5202, 5302, 5492, and 5502, respective random access memories (RAMs) 5103, 5203, 5303, 5403, and 5503, input and output (I/O) ports 5104, 5204, 5304, 5404, and 5504, and bus lines 5105, 5205, 5305, 5405, and 5505.

Each of the CPUs 5101, 5201, 5301, 5401, and 5501 serves as an arithmetic processing unit to execute, for example, sequential processing, branching processing, and iterative processing when the program stored in each of the ROMs 5102, 5202, 5302, 5402, and 5502 starts.

Each of the ROMs 5102, 5202, 5302, 5402, and 5502 serves as a non-volatile memory in which the program to be executed by each of the CPUs 5101, 5201, 5301, 5401, and 5501 is stored.

Each of the RAMs 5103, 5203, 5303, 5403, and 5503 serves as a memory that functions as a work area of the operations of the CPUs 5101, 5201, 5301, 5401, and 5501.

Each of the I/O ports 5104, 5204, 5304, 5404, and 5504 is an interface via which various signals including an output signal and data of each of the recording medium sensors 512, 522, 532, 542, and 552 are input and various signals including the driving signal to the drive devices 511, 521, 531, 541, and 550 are output.

Each of the bus lines 5105, 5205, 5305, 5405, and 5505 serves as an address bus or a data bus to electrically connect the components such as the CPUs 5101, 5201, 5301, 5401, and 5501 to each other.

For example, the setting information from the control panel 44 may be input to the controller 540 through the I/O port 5404 or the output data to the controller 530 and the controller 550 may be output through the I/O port 5404. The controller 540 may be connected to the control panel 44 and the controller 530, 520, 510, and 550 via the bus line 5405.

Figure 5:
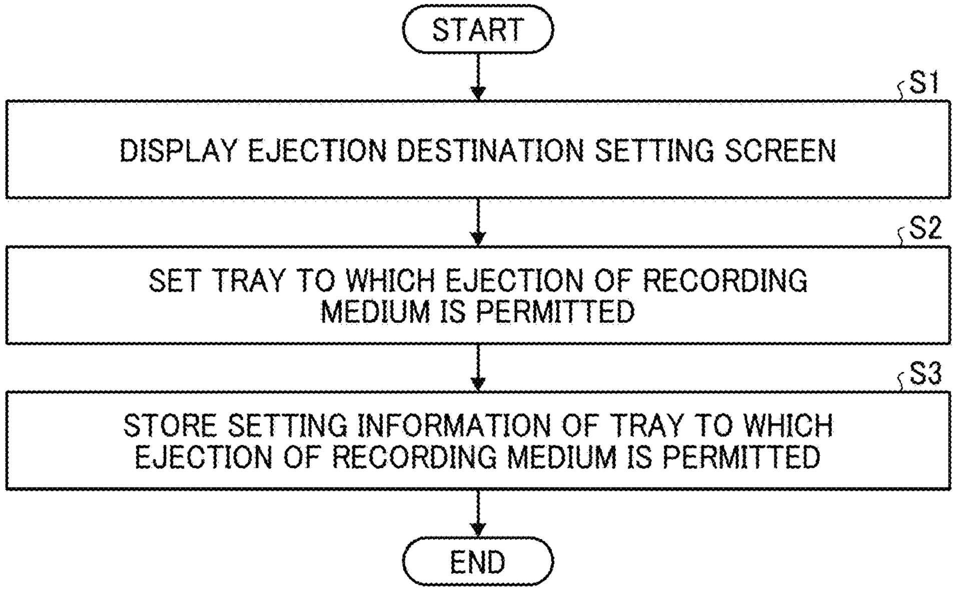
FIG. 5 is a flowchart of the setting of an ejection tray set to receive recording media, according to an embodiment of the present disclosure.

FIG. 5 is a flowchart of the setting of the ejection tray set to receive the recording medium with no jam, according to an embodiment of the present disclosure.

As described above, in the image forming system 100 according to the present embodiment, the ejection destinations can be indicated through the control panel 44 for ejecting the recording media traveling upstream and downstream from a jammed recording medium in the conveyance direction of the recording medium when a jam occurs in the image forming system 100 and can be previously set by the corresponding controller. In other words, the ejection destinations to eject the recording media that are not jammed and travel upstream and downstream from the jammed recording medium in the conveyance direction of the recording medium can be indicated through the control panel 44 and be set in advance by the corresponding controller.

When the ejection destination is set, the control panel 44 displays an ejection destination setting screen (step S1). Then, the user sets whether to permit ejection of the recording medium not jammed to a tray, via the ejection destination setting screen displayed on the control panel 44 (step S2). Then, in the apparatus that includes the tray set by the user, the memory included in the apparatus stores the setting information about a set tray to with the ejection of a recording medium (or recording media) not jammed is permitted (step S3).

With this operation, the setting of the ejection destination is completed and, when the jam of the recording medium S is detected in the image forming system 100, the recording media S not jammed are automatically conveyed to the tray permitted to receive the recording media S not jammed.

Figure 6:
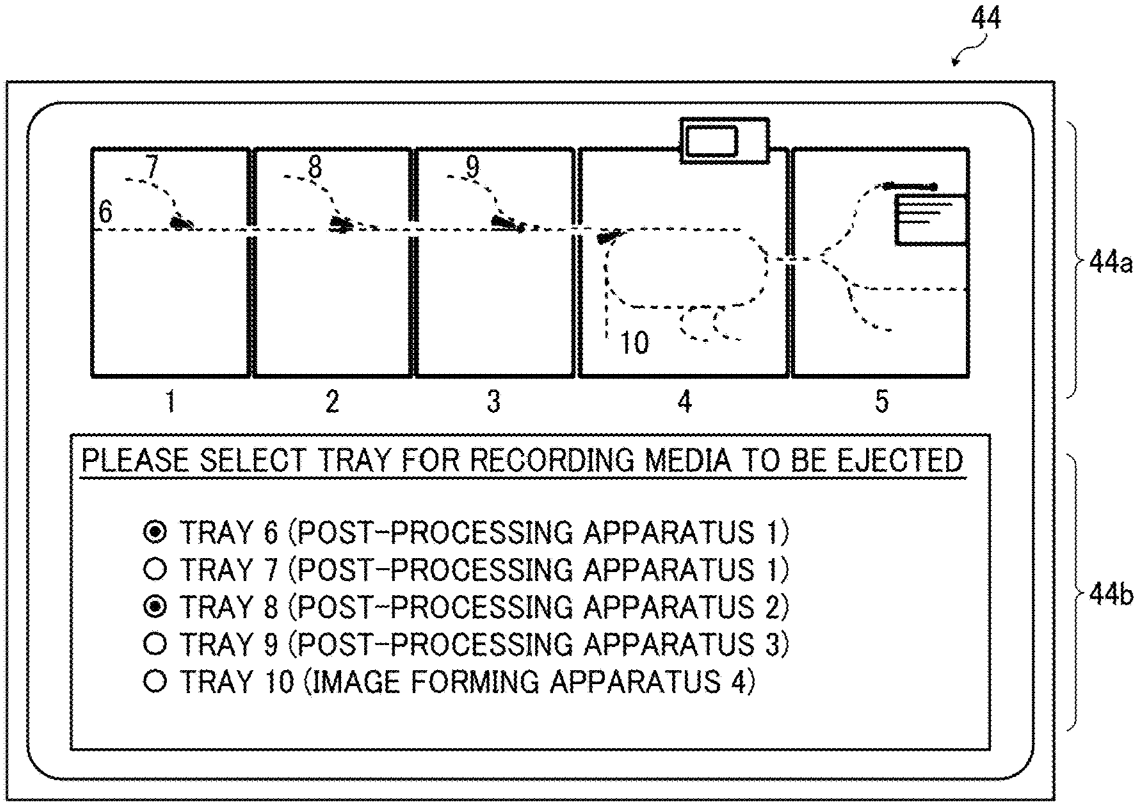
FIG. 6 is a diagram illustrating a display of ejection destination setting screen of a control panel according to an embodiment of the present disclosure.

FIG. 6 is a diagram illustrating a display of ejection destination setting screen of a control panel according to an embodiment of the present disclosure.

The control panel 44 includes an image part 44*a* and a selection part 44*b*. The image part 44*a* is the upper half part of the screen illustrated in FIG. 6 to display the image forming system and the ejection trays. The selection part 44*b* is the lower part of the screen illustrated in FIG. 6 to display the trays for ejection of the recording medium. Specifically, the selection part 44*b* displays the tray numbers of the trays each being selectable as an ejection destination and the apparatus names that include the respective trays. The tray numbers of the trays in the selection part 44*b* match the numbers displayed in the image part 44*a*.

The user sets, from the screen, a tray to which ejection of the recording medium (recording media) not jammed. For example, the tray to which ejection of the recording medium not jammed is permitted by ticking a check column displayed on the left of the tray name in the selection part 44*b*. Multiple trays may be set. FIG. 6 indicates that the user has specified the trays to receive the recording medium (recording media) not jammed, to Tray 6 of the post-processing apparatus 1 and to Tray 8 of the post-processing apparatus 2.

Note that the control panel 44 may set the priority of ejection of recording media in addition to specifying the tray (trays) as the ejection destination of the recording media not jammed. For example, in the display of the selection pan 44*b*, the user may move the tray number and the apparatus name up and down for sorting, so that the memory may store the display of sorting as the priority.

Figure 7:
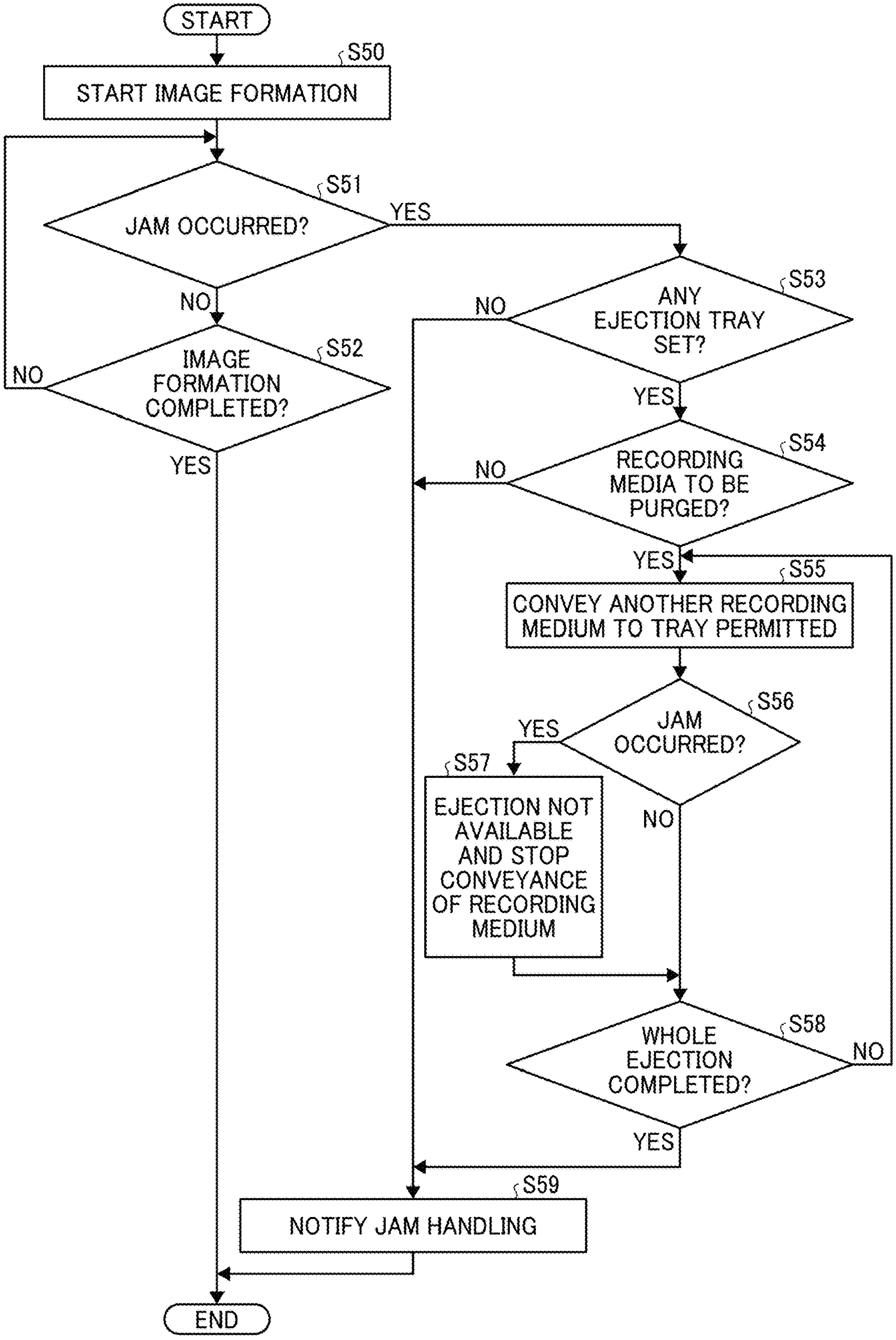
FIG. 7 is a flowchart of an ejection control of a recording medium, according to an embodiment of the present disclosure.

FIG. 7 is a flowchart of an ejection control of a recording medium, according to an embodiment of the present disclosure.

The image forming system 100 starts to perform the image forming process (image formation) on the recording medium S based on the instruction from the controller 540 of the image forming apparatus 4 (step S50). While the recording medium S is in the image forming system 100, the recording medium sensors disposed in the recording medium feeding apparatus 5, the image forming apparatus 4, the post-processing apparatus 1, the post-processing apparatus 2, and the post-processing apparatus 3 detect the conveyance state of the recording media S, so that occurrence of jam is detected (step S51). When no recording medium is jammed in the image forming system 100, it is determined whether the image forming process is completed on the given number of recording media S (step S52). When the image forming process is completed on the given number of recording media S (YES in step S52), the process in the flowchart of FIG. 5 ends. When the image forming process (image formation) is not completed on the given number of recording media S (NO in step S52), the step S51 is repeated and the image forming process continues until the image forming process on the predetermined number of recording media S is completed while detecting whether any recording medium is jammed.

When a recording medium is jammed after the start of the image forming process, the controller of each of the apparatuses determines whether there is any tray specified by the user as an ejection destination of the recording medium (recording media) not jammed (step S53). When it is determined that no ejection destination is set, in other words, that no tray is permitted to receive the recording medium not jammed, the image forming system 100 conveys the recording medium S that is conveyable (movable), to a closest tray, for example, that is available to purge (eject) the recording medium S. For example, when the recording media not jammed are not ejected to the ejection trays 11, 14 of the post-processing apparatus 1, the ejection tray 21 of the post-processing apparatus 3, and the ejection tray 31 of the post-processing apparatus 3, the recording media traveling in the post-processing apparatus 1, the post-processing apparatus 2, and the post-processing apparatus 3 are stopped at the respective locations. Further, among the recording media S traveling in the image forming apparatus 4, the recording medium S upstream from the conveyance passage changing gate 42 in the conveyance direction of the recording medium is ejected to the tray 41 of the image forming apparatus 4. The case where the cannot be ejected to the ejection trays 11, 14, 21, and 31 indicates the case where the ejection trays 11, 14, 21, and 31 are not permitted to receive the recording medium not jammed or the case where the recording medium cannot be ejected to the tray permitted to receive the recording medium not jammed.

Then, the image forming system 100 displays, for example, tray information about the ejection destination on the control panel 44 so that the user can know where the conveyable (movable) recording media are ejected. When it is determined that the recording media S are not available to be purged and remain in the apparatuses (hereinafter, also referred to as remaining recording media), information about, for example, the jam handling procedure of the remaining recording media S is displayed on the control panel 44 to notify the user of the method of the jam handling (step S59).

When it is determined that the ejection destination is set in step S53, it is determined whether the recording media traveling upstream and downstream from the jammed recording media S in the conveyance direction of the recording medium are available to be purged (step S54). When it is determined that the recording media are not available to be purged due to the jam condition, the jam handling procedure for the recording media remaining in the image forming system 100 is displayed on the control panel 44 to notify the user of the jam handling (step S59).

When it is determined that the recording media are available to be purged in step S54, the recording media S traveling upstream and downstream from the jammed recording media S in the conveyance direction of the recording media are ejected to the ejection tray specified by the user as an ejection destination of the recording medium not jammed (step S55). Among the recording media S having been traveling in the image forming apparatus 4, the recording media S that are available to change the output destination by the conveyance passage changing gate 42 is ejected to the tray 41 of the image forming apparatus 4.

Whether a recording medium is jammed or not is detected even while the processing of step S55 is being executed (step S56). When no recording medium is jammed in the image forming system 100 in step S56, it is determined whether the ejection of the whole recording media S to be ejected is completed (step S58). When the ejection of the whole recording media S to be ejected is completed (YES in step S58), the ejection operation of the recording media S in the flowchart of FIG. 5 ends. When the ejection of the recording media S to be ejected is not completed (NO in step S58), the recording media S to be ejected are ejected to the ejection tray specified by the user as an ejection destination of the recording medium not jammed while detection of the jam is being executed.

When a new jam occurs in step S56 and the newly jammed recording medium S is in the conveyance passage P and thus makes the ejection of the recording medium not available, the conveyance operation of the recording medium is stopped (step S57) to complete the ejection operation. When it is determined that the ejection operation is completed, the jam handling procedure is displayed on the control panel 44 to notify the user of the jam handling (step S59).

As described above, the image forming system 100 according to the present embodiment includes the image forming apparatus 4 that includes the image forming device 43 to perform an image forming process, the recording medium feeding apparatus 5 to feed the recording medium S to the image forming apparatus 4, and the post-processing apparatus 1 that ejects the recording medium S conveyed from the image forming apparatus 4. The post-processing apparatus 1 includes the ejection trays 11 and 14 to eject the recording medium S traveling in the post-processing apparatus 1. The image forming system 100 further includes the ejection destination setting units 540A and 510A, and the controllers 510 and 540. Each of ejection destination setting units 540A and 510A is used to set whether to permit ejection of the recording media S traveling upstream and downstream from the jammed recording medium in the conveyance direction of the recording medium, to the ejection trays 11 and 14 when the recording medium S is jammed in the image forming system 100. In response to detection of the jammed recording medium S, the controllers 510 and 540 cause the traveling recording media S to be ejected to the ejection trays 11 and 14 that are set by the ejection destination setting units 540A and 510A.

With this operation, when the jam of the recording medium S is detected in the image forming system 100, the recording media S not jammed are automatically conveyed to the ejection tray specified by the user as an ejection destination of the recording media S. As a result, the image forming system reduces the number of times for selecting the purge destination (ejection destination).

As described above, the image forming apparatus 4 includes a tray 41 to which the recording medium S traveling in the image forming apparatus 4 is ejected.

Due to this configuration, the recording medium S that has not passed the conveyance passage changing gate 42 of the image forming apparatus 4 is ejected to the tray 41. As a result, the ejection destination of the recording medium S is decentralized, and the ejection time is shortened.

Further, as described above, a plurality of post-processing apparatuses (e.g., the post-processing apparatus 1, the post-processing apparatus 2, and the post-processing apparatus 3), are disposed at the subsequent stage of the image forming apparatus 4, in other words, the post-processing apparatus 1, the post-processing apparatus 2, and the post-processing apparatus 3 are disposed downstream from the image forming apparatus 4 in the conveyance direction of the recording medium. The post-processing apparatus 1 includes the ejection trays 11 and 14. The post-processing apparatus 2 includes the ejection tray 21, The post-processing apparatus 3 includes the ejection tray 31.

Due to this configuration, the number of remaining recording media S stopped in the image forming system 100 is reduced and the jam handling time is shortened.

As described above, the control panel 44 can be used to specify an ejection destination and priority of specifying the recording media S to the ejection trays 11, 14, 21, and 31 and the tray 41 as the specified ejection destination.

As a result, the recording media S not jammed are automatically ejected to the ejection tray based on the priority for ejection specified by the user.

As described above, the image forming apparatus 4 includes the conveyance passage changing gate 42 to change between the first position at which the recording medium S not jammed is guided to the post-processing apparatus 3 and the second position at which the recording medium S not jammed is guided to the tray 41.

Due to this configuration, the recording medium S that has not passed the conveyance passage changing gate 42 of the image forming apparatus 4 is ejected to the tray 41.

Now, a description is given of a specific example of the ejection destination depending on the position of the jam, with reference to FIGS. 8 to 11

Note that this specific example is an example of the ejection destination, and the ejection destination is not limited to the following four patterns illustrated in FIGS. 8 to 11.

Pattern 1

Figure 8:
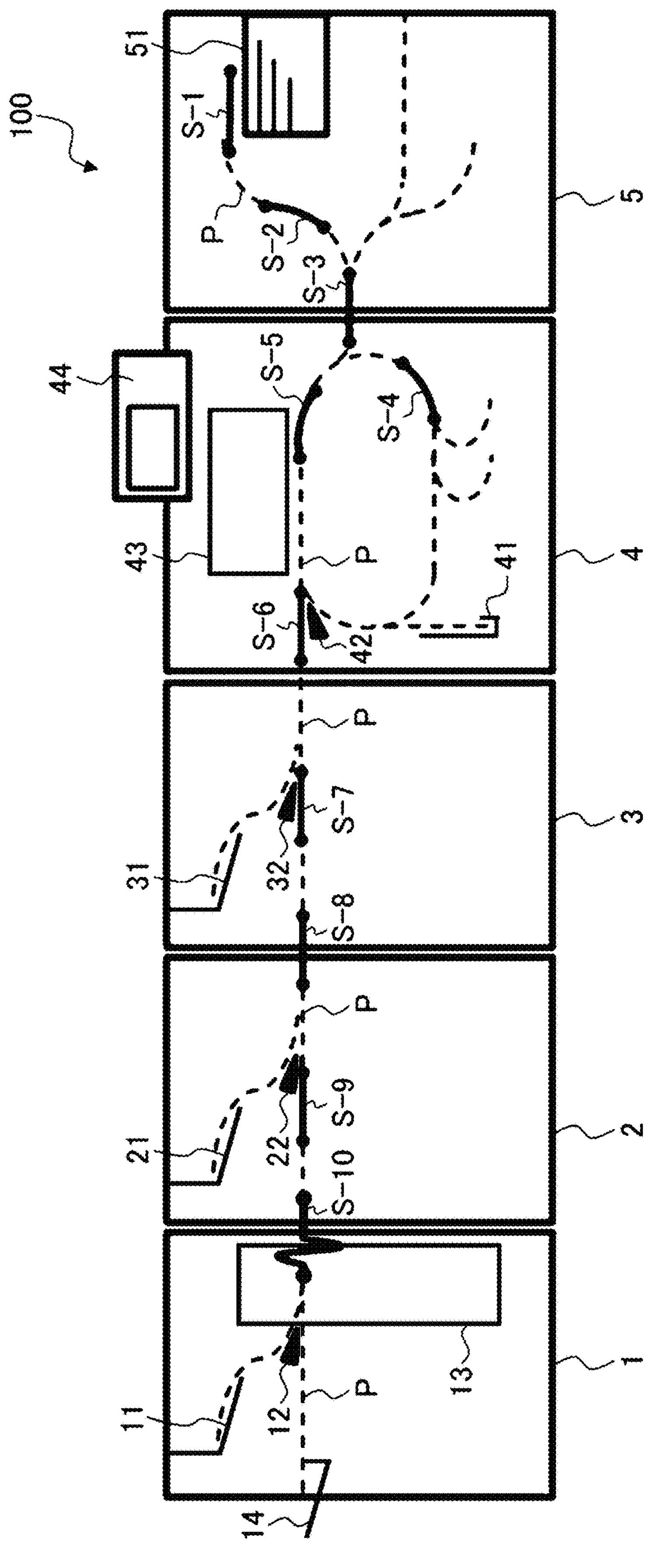
FIG. 8 is a diagram illustrating an ejection operation of the recording medium when a jam occurs, according to an embodiment of the present disclosure.

FIG. 8 is a diagram illustrating an ejection operation of the recording medium when a jam occurs, according to an embodiment of the present disclosure.

Pattern 1 is a case where the recording medium S-10 is jammed in the post-processing apparatus 1.

It is assumed that the regular ejection destination is set to the ejection tray 14 of the post-processing apparatus 1 and the ejection destinations during the jam are set to the ejection trays 11, 14, 21, and 31 that are permitted to receive the recording media not jammed.

In this case, the jammed recording medium S-10 and the recording medium S-9 that has passed the conveyance passage changing gate 22 of the post-processing apparatus 2 are stopped at the respective locations. The recording media S-8, 5-7, and S-6 are ejected to the ejection tray 21 of the post-processing apparatus 2. Since the recording medium S-6 has passed the conveyance passage changing gate 42 of the image forming apparatus 4, the recording medium S-6 is ejected to the extreme-downstream ejection tray available to receive the ejected recording medium S-6, among the ejection trays to which the ejection of the recording media not jammed is permitted. In the present example, the extreme-downstream ejection tray corresponds to the ejection tray 21.

The recording media S-1, S-2, S-3, S-4, and S-5 are ejected to the tray 41 of the image forming apparatus 4. Note that the image forming device 43 is not allowed to perform the image forming process during the jam, and the image forming process is not allowed on the recording media S to be ejected to the ejection trays 11, 14, 21, or 31 or the tray 41 via the image forming device 43.

As described above, in the present embodiment, when the recording media S-1 to S-8 not jammed are ejected to the ejection tray 21 or the tray 41 via the image forming device 43 of the image forming apparatus 4, the image forming device 43 is not allowed to perform the image forming process on the recording media S-1 to S-8.

Further, as described above, when the recording medium S-9 is not ejected to any of the ejection trays 11, 14, 21, and 31 permitted with via the control panel 44 to receive the recording media S, the recording medium S-9 is stopped at the location.

As described above, among the recording media S-4, S-5, and S-6 traveling in the image forming apparatus 4, the recording media S-4 and S-5 at the locations available to change the ejection destination by the conveyance passage changing gate 42 are ejected to the tray 41. The recording media S-1, S-2, and S-3 traveling in the recording medium feeding apparatus 5 are also ejected to the tray 41. Among the recording media S-4, 5-5, and S-6 traveling in the image forming apparatus 4, the recording medium S-6 at a location not available to change the ejection destination by the conveyance passage changing gate 42 is ejected to the ejection tray 21.

Further, as described above, among the recording media S-4, S-5, and S-6 having been traveling in the image forming apparatus 4, the recording medium S-6 at the location not available to change the ejection destination by the conveyance passage changing gate 42 is ejected to the ejection tray 21 of the extreme-downstream post-processing apparatus 2 available to receive the recording media not jammed, among the plurality of post-processing apparatuses (e.g., the post-processing apparatus 1, the post-processing apparatus 2, and the post-processing apparatus 3) permitted with the control panel 44 to receive the recording media not jammed.

Pattern 2

Figure 9:
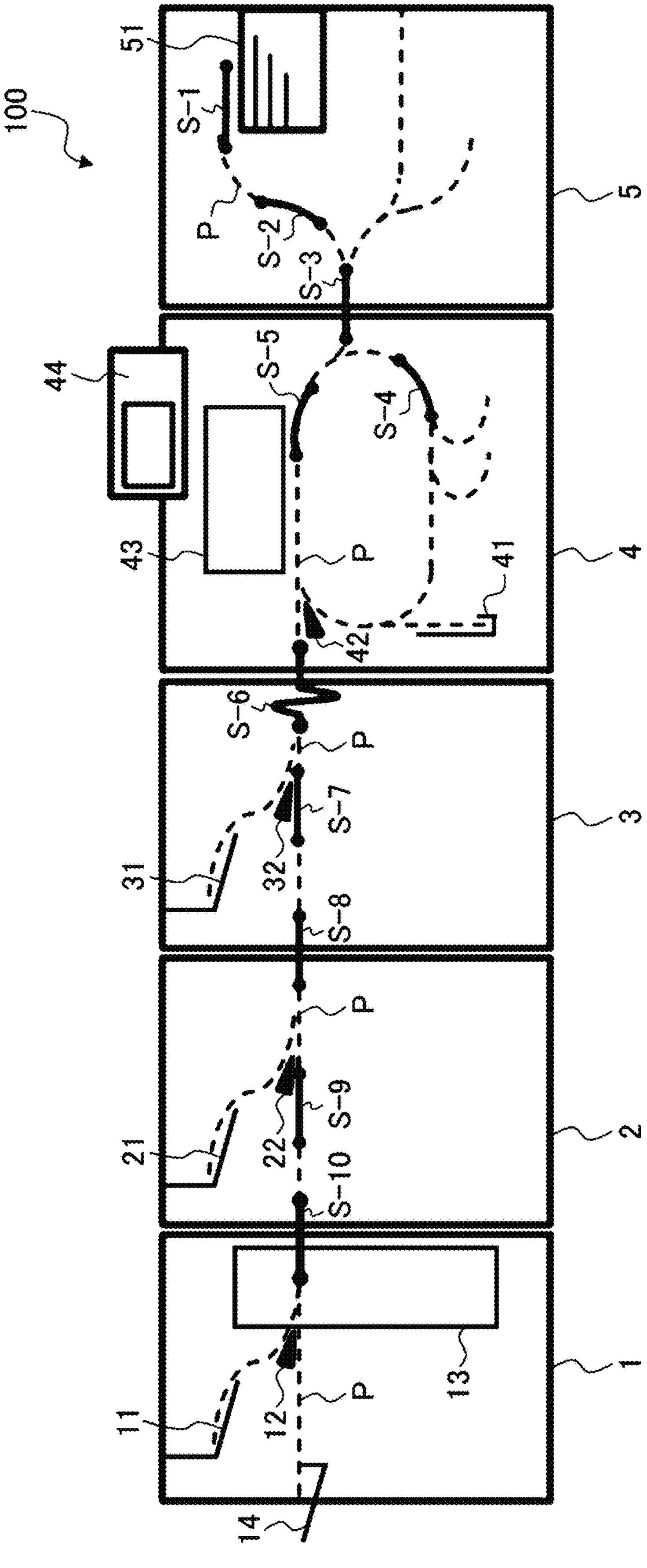
FIG. 9 is a diagram illustrating the ejection operation of the recording medium when another jam occurs, according to an embodiment of the present disclosure.

FIG. 9 is a diagram illustrating the ejection operation of the recording medium when another jam occurs, according to an embodiment of the present disclosure.

Pattern 2 is a case where the recording medium S-6 is jammed in the post-processing apparatus 3.

It is assumed that, like Pattern 1, the regular ejection destination is set to the ejection tray 14 of the post-processing apparatus 1 and the ejection destinations during the jam are set to the ejection trays 11, 14, 21, and 31 to which the ejection of the recording media not jammed is permitted.

In this case, the jammed recording medium S-6 is stopped at the location. The recording media S-10, S-9, S-8, and S-7 are located downstream from the location where the jam occurs in the conveyance direction of the recording medium and are not susceptible to the jammed recording medium S-6. For this reason, the recording media S-10, S-9, S-8, and S-7 are ejected to the ejection tray 14 that is a regular ejection destination in the normal state.

The recording media S-1, S-2, S-3, S-4, and S-5 are ejected to the tray 41 of the image forming apparatus 4. Note that the image forming device 43 is not allowed to perform the image forming process during the jam, and the image forming process is not allowed on the recording media S to be ejected to the ejection trays 11, 14, 21, or 31 or the tray 41 via the image forming device 43. For example, in a case where the image forming apparatus 4 employs electrophotography, the secondary transfer current of a secondary transfer device (secondary transfer roller) is turned off in the jam. By conveying the recording medium S in this condition, the toner image is not transferred onto the recording medium S that passes the transfer position.

The recording media S-10, S-9, S-8, and S-7 may be ejected to the extreme-downstream ejection tray (for example, the ejection tray 11) to which ejection of the recording media not jammed is permitted, among the ejection trays 11, 21, and 31 other than the ejection tray 14.

As described above, in the present embodiment, when the recording media S-10, S-9, S-8, and S-7 that are conveyable (movable) in the image forming system 100 are located between the ejection tray 14 that is set as the regular ejection destination of the recording media S and the recording medium S-6 that is jammed upstream from the ejection tray 14 in the conveyance direction of the recording medium, the recording media S-10, S-9, S-8, and S 7 are ejected to the ejection tray 14.

Alternatively, as described above, when the recording media S-10. S-9, S-8, and S-7 that are conveyable (movable) in the image forming system 100 are located between the ejection tray 14 that is set as the regular ejection destination of the recording media S and the recording medium S-6 that is jammed upstream from the ejection tray 14 in the conveyance direction of the recording media, the recording media S-10, S-9, S-8, and S-7 are ejected to the extreme-downstream ejection tray (for example, the ejection tray L 1) among the ejection trays 11, 21, and 31 to which the ejection of the recording media S is permitted with the control panel 44.

When the recording media S-1 to S-5 and S-7 to S-10 not jammed as described above are ejected to the ejection tray 21 or the tray 41 via the image forming device 43 of the image forming apparatus 4, the image forming device 43 is not allowed to perform the image forming process on the recording media S-1 to S-5 and S-7 to S-10.

Pattern 3

Figure 10:
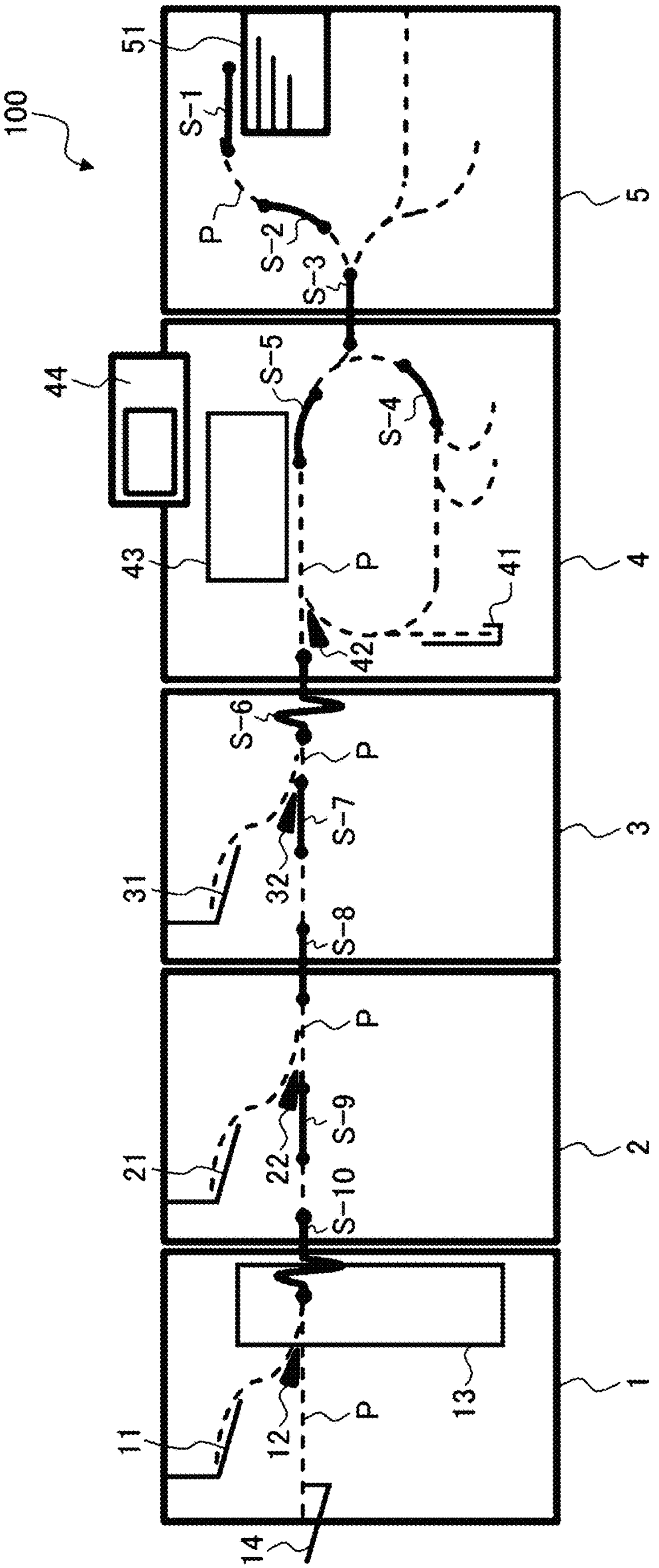
FIG. 10 is a diagram illustrating the ejection operation of the recording medium when yet another jam occurs, according to an embodiment of the present disclosure.

FIG. 10 is a diagram illustrating the ejection operation of the recording medium when yet another jam occurs, according to an embodiment of the present disclosure.

Pattern 3 is a case where the recording media S-10 and S-6 are jammed in the post-processing apparatus 1 and the post-processing apparatus 3, respectively.

It is assumed that the regular ejection destination is set to the ejection tray 14 of the post-processing apparatus 1 and the ejection destinations during the jam are set to the ejection trays 11, 14, 21, and 31 to which ejection of the recording media not jammed is permitted.

In this case, the jammed recording media S-10 and S-6 and the recording medium S 9 that has passed the conveyance passage changing gate 22 of the post-processing apparatus 2 are stopped at the respective locations. The recording media S-8 and S-7 are ejected to the extreme-downstream ejection tray, i.e., the ejection tray 21 available for ejection of the recording medium, among the ejection trays to which the ejection of the recording media not jammed is permitted.

The recording media S-1, S-2, S-3, S-4, and S-5 are ejected to the tray 41 of the image forming apparatus 4. Note that the image forming device 43 is not allowed to perform the image forming process during the jam, and the image forming process is not allowed on the recording media S to be ejected to the ejection trays 11, 14, 21, or 31 or the tray 41 via the image forming device 43.

As described above, in the present embodiment, when the recording media S-1 to S 5, S-7, and S-8 not jammed are ejected to the ejection tray 21 or the tray 41 via the image forming device 43 of the image forming apparatus 4, the image forming device 43 is not allowed to perform the image forming process on the recording media S-1 to S-5, S-7, and S 8.

Further, as described above, when the recording medium S-9 is not ejected to any of the ejection trays 11, 14, 21, and 31 to which ejection of the recording media S is permitted with the control panel 44, the recording medium S-9 is stopped at the location.

Pattern 4

Figure 11:
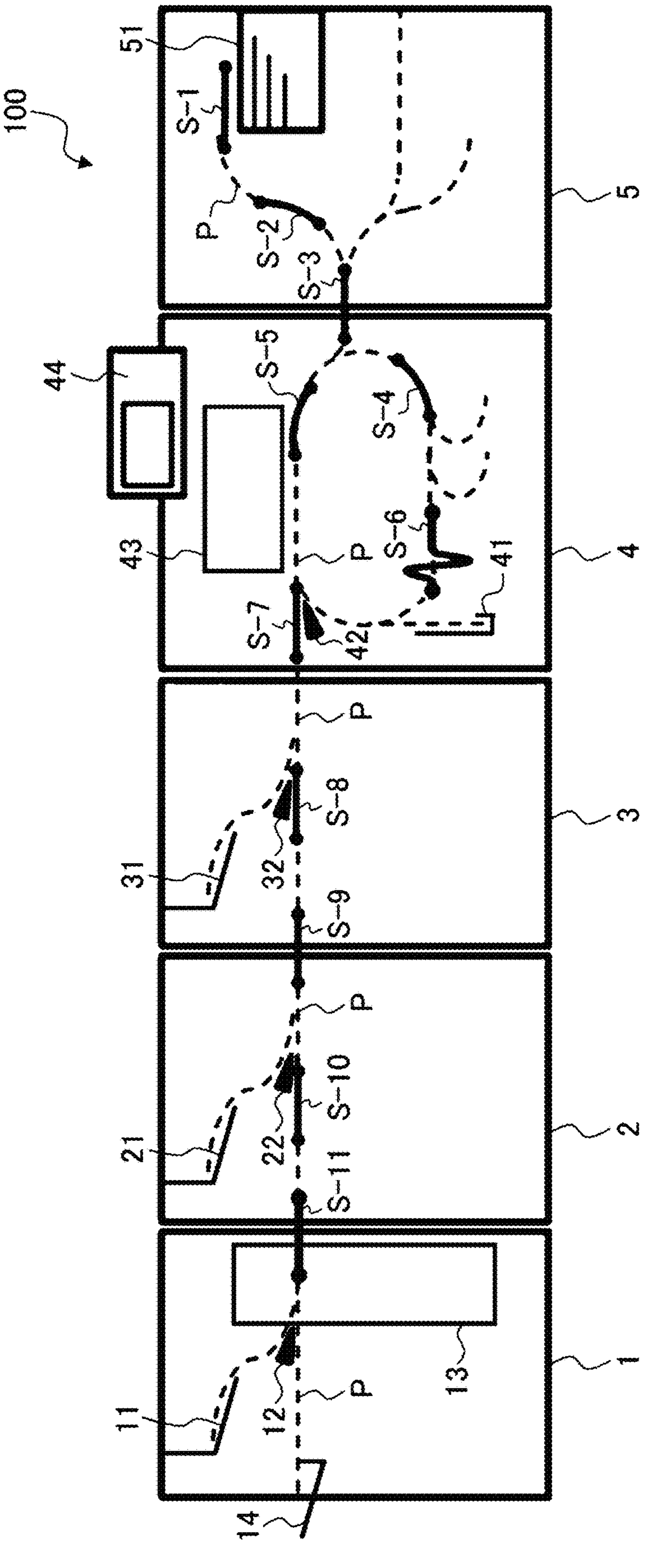
FIG. 11 is a diagram illustrating the ejection operation of the recording medium when yet another jam occurs, according to an embodiment of the present disclosure.

FIG. 11 is a diagram illustrating the ejection operation of the recording medium when yet another jam occurs, according to an embodiment of the present disclosure.

Pattern 4 is a case where the recording medium S-6 is jammed in the image forming apparatus 4.

It is assumed that the regular ejection destination is set to the ejection tray 14 of the post-processing apparatus 1 and the ejection destinations during the jam are set to the ejection trays 11, 14, 21, and 31 to which ejection of the recording media not jammed is permitted.

In this case, the jammed recording medium S-6 is stopped at the location. The recording media S-11, S-10, S-9, S-8, and S-7 are located downstream from the location where the jam occurs in the conveyance direction of the recording medium and are not susceptible to the jammed recording medium S-6. For this reason, the recording media S-11, S-10, S-9, S-8, and S-7 are ejected to the ejection tray 14 that is the regular ejection destination in the normal state.

The recording media S-1, S-2, S-3, S-4, and S-4 are ejected to the tray 41 of the image forming apparatus 4. Note that the image forming device 43 is not allowed to perform the image forming process during the jam, and the image forming process is not allowed on the recording media S to be ejected to the ejection trays 11, 14, 21, or 31 or the tray 41 via the image forming device 43.

The recording media S-11, S-10, S-9, S-8, and S-7 may be ejected to the extreme-downstream ejection tray (for example, the ejection tray 11) to which ejection of the recording media not jammed is permitted, among the ejection trays 11, 21, and 31 other than the ejection tray 14.

As described above, in the present embodiment, when the jammed recording medium S-6 is in the image forming apparatus 4 and the recording media S-4 and S-5 that are conveyable (movable) to the tray 41 are in the image forming apparatus 4, the recording media S-4 and S-5 are ejected to the tray 41.

As described above, when the recording media S-1 to S-5 and S-7 to S-11 not jammed are ejected to the ejection tray 14 or the tray 41 via the image forming device 43 of the image forming apparatus 4, the image forming device 43 is not allowed to perform the image forming process on the recording media S-1 to S-5 and S-7 to S-11.

Further, as described above, when the recording media S-11, S-10, S-9, S-8, and S-7 that are conveyable (movable) are located between the ejection tray 14 that is set as the regular ejection destination of the recording media S and the recording medium S-6 that is jammed upstream from the ejection tray 14 in the conveyance direction of the recording medium, the recording media S-11, S-10, S-9, S-8, and S-7 are ejected to the extreme-downstream ejection tray (for example, the ejection tray 11) among the ejection trays 11, 21, and 31 to which ejection of the recording media S is permitted with the control panel 44.

The four patterns described above are examples. However, due to the configurations of the patterns, when the jam occurs, the recording medium (recording media) not jammed in the conveyance passage P is conveyed to an appropriate position and the number of remaining recording media stopped in the image forming system is reduced. As a result, the jam handling time is shortened.

Figure 12:
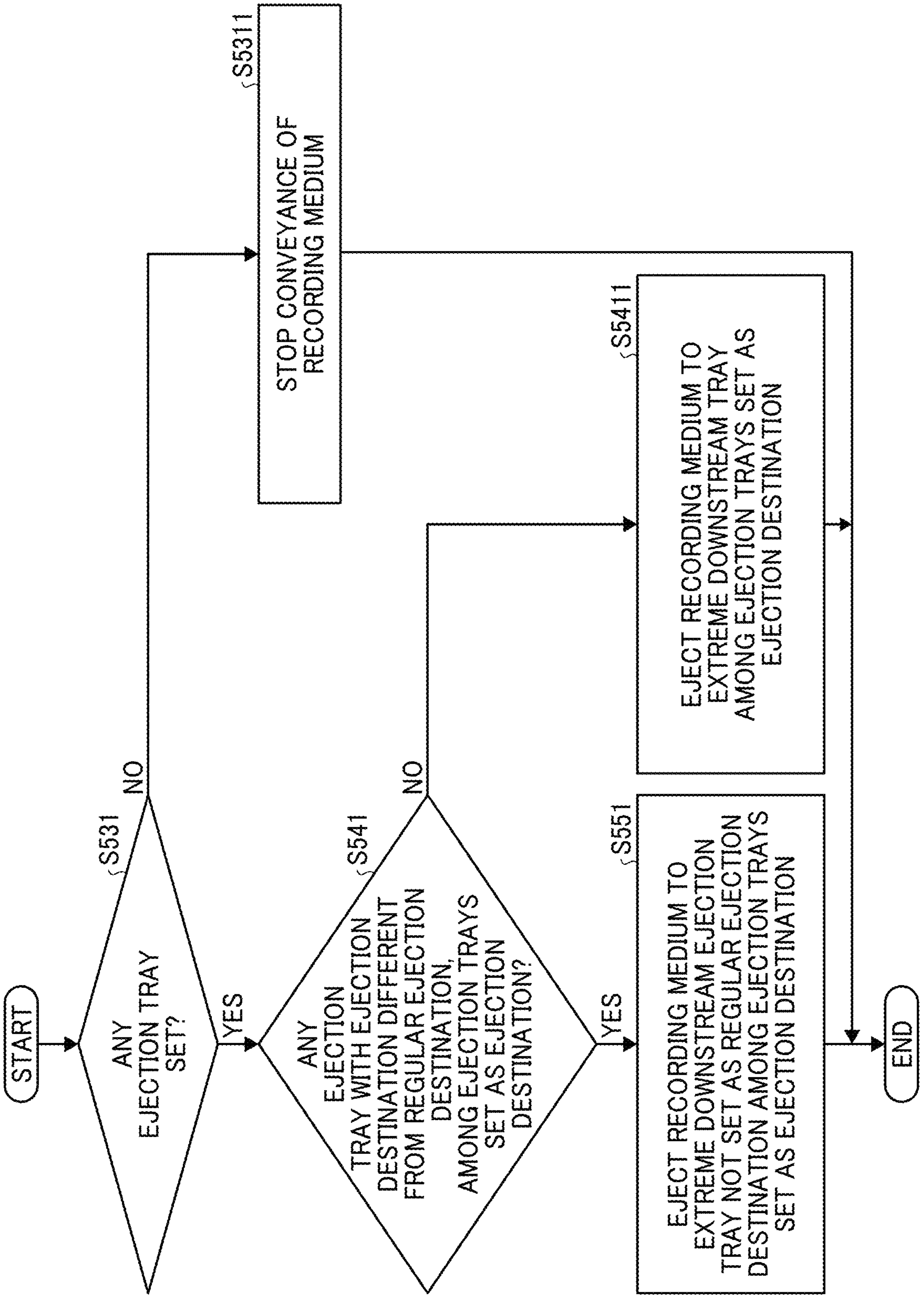
FIG. 12 is a flowchart of the ejection control of the recording medium, according to a modification of the above embodiments of the present disclosure.

FIG. 12 is a flowchart of the ejection control of the recording medium according to a modification of the above embodiments of the present disclosure.

In the flowchart in FIG. 7, steps S53 to S55 may be changed to the flowchart in FIG. 12.

When a tray used as a regular discharge destination and a tray used as a discharge destination at the time of occurrence of a jam are the same, a recording medium on which an image has been normally formed and a recording medium discharged due to the jam are mixed in the same tray.

In this modification, when a recording medium is jammed after the start of the image forming process, the controller of each apparatus determines whether there is any tray set by a user as an ejection destination of the recording media (step S531).

When it is determined that the ejection destination is set (YES in step S531), it is determined whether the ejection tray different from the regular ejection destination is included in the ejection trays to which ejection of the recording medium not jammed is permitted by the user (step S541).

When it is determined that the ejection tray different from the regular ejection destination is included in the ejection trays to which ejection of the recording medium not jammed is permitted in step S541, the recording medium S is ejected to the tray that is not set as the regular ejection destination and is disposed at the extreme downstream in the conveyance direction of the recording medium, among the ejection trays to which ejection of the recording medium not jammed is permitted by the user (step S551).

When it is determined that the output destination is not set (NO in step S531), conveyance of the recording medium S in the image forming system 100 is stopped (step S5311). Then, the processing in step S59 in the flowchart of FIG. 2 (notification of jam handling) is executed. Further, when it is determined that the ejection tray different front the regular ejection destination is not included in the ejection trays to which ejection of recording media not jammed is permitted by the user in step S541, the recording medium S is ejected to the extreme-downstream tray among the ejection trays to which ejection of the recording media S not jammed is permitted (step S5411). Then, the processing in step S59 in the flowchart of FIG. 7 (notification of jam handling) is executed.

According to the modification, the chances of sharing (mixing) a tray between the recording medium on which the image forming process is performed normally and the recording medium ejected due to the jam may be reduced.

Figure 13:
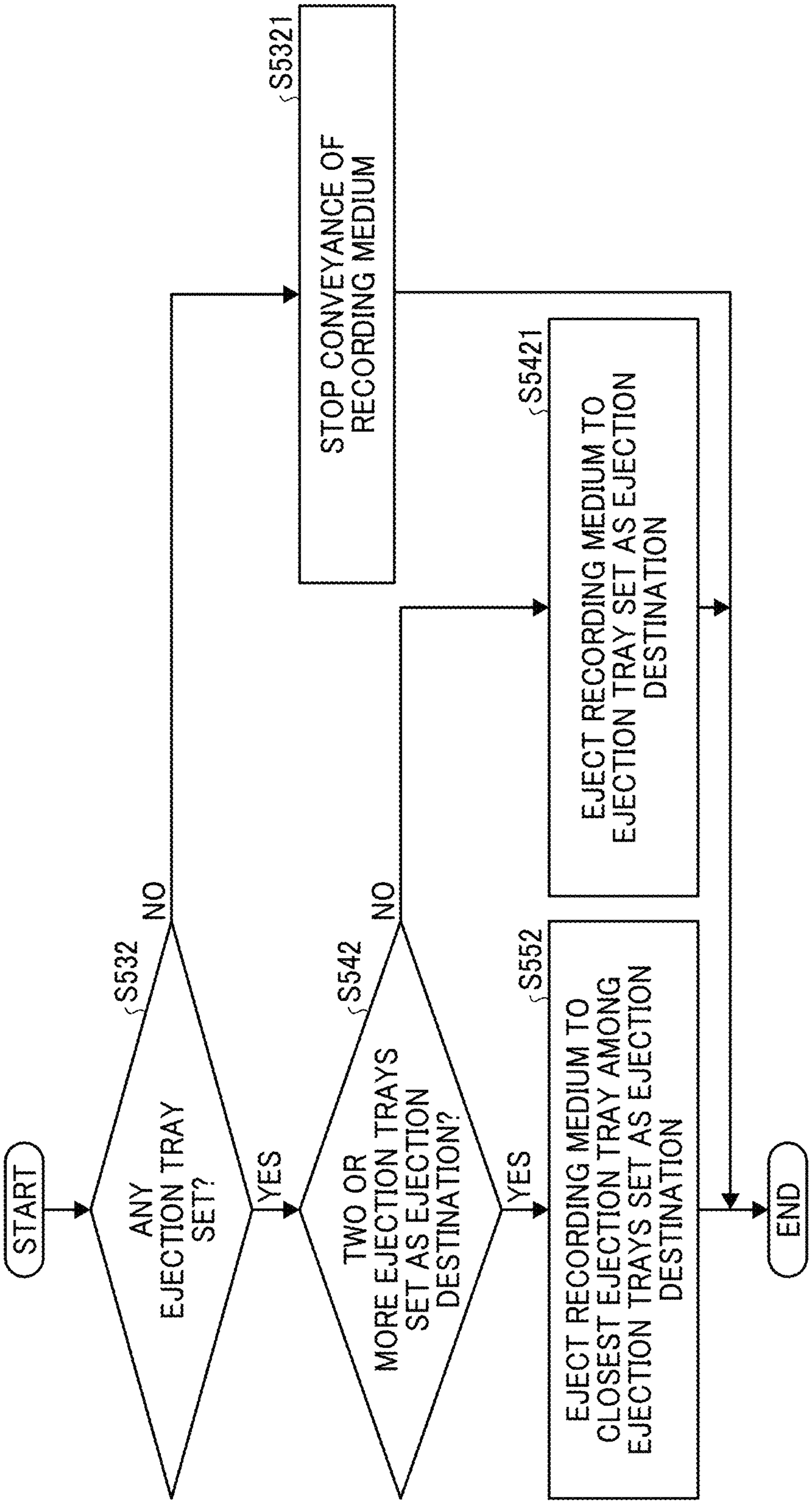
FIG. 13 is a flowchart of the ejection control of the recording medium, according to another modification of the above embodiments of the present disclosure.

FIG. 13 is a flowchart of the ejection control of the recording medium, according to another modification of the above embodiments of the present disclosure.

In the flowchart in FIG. 7, steps S53 to S55 may be changed to the flowchart in FIG. 13.

In the above-described embodiments, since the recording media S are collectively ejected to the extreme-downstream ejection tray among the ejection trays to which ejection of the recording media S not jammed is permitted by the user, the ejection may take time until completion of the ejection of the recording media S.

In this modification, when a recording medium is jammed after the start of the image forming process, the controller of each apparatus determines whether there is any tray set by a user as an ejection destination of the recording media (step S532).

When it is determined that the ejection destination is set (YES in step S532), it is determined whether there is a plurality of ejection trays to which ejection of the recording media not jammed is specified by the user to permit ejection of the recording media S not jammed (step S542).

When it is determined that there is a plurality of ejection trays to which ejection of the recording media not jammed is specified by the user to permit ejection of the recording media S not jammed (YES in step S542), the recording medium S is ejected to the tray that is closest to the position of the recording medium S to be ejected, among the ejection trays to which the ejection of the recording medium S not jammed is permitted (step S552).

When it is determined that the ejection destination is not set (NO in step S532), conveyance of the recording medium S in the image forming system 100 is stopped (step S5321). Then, the processing in step S59 in the flowchart of FIG. 7 (notification of jam handling) is executed. Further, when it is determined that there is not a plurality of ejection trays to which ejection of the recording media not jammed is permitted (NO in step S542), the recording medium S is ejected to the ejection tray to which ejection of the recording media not jammed is permitted (step S542*i*). Then, the processing in step S59 in the flowchart of FIG. 2 (notification of jam handling) is executed. According to this modification, the ejection time of the recording medium S is reduced.

In step S552, the recording medium S is ejected to the tray that is closest to the position of the recording medium S to be ejected. However, when the user specifies the ejection tray to permit ejection of the recording media S not jammed, via the control panel 44, the priority of ejection of the recording media S may be specified via the control panel 44. In this case, the controller of each apparatus determines whether the recording medium S is to be ejected to an ejection tray having the higher priority. When it is determined that the recording medium S is to be ejected to the ejection tray having the higher priority, the recording medium S is ejected to the ejection tray.

Figure 14:
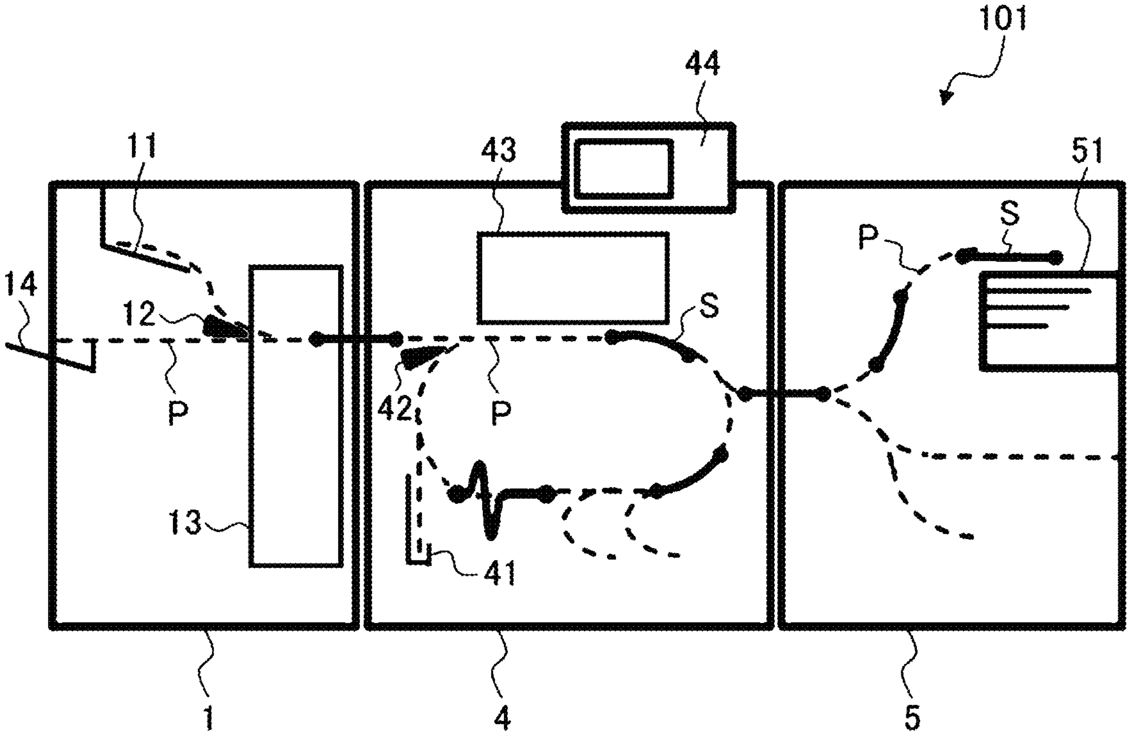
FIG. 14 is a schematic diagram illustrating the processing system in its entirety, according to a modification of the above embodiments of the present disclosure.

FIG. 14 is a schematic diagram illustrating the processing system in its entirety, according to a modification of the above embodiments of the present disclosure.

Note that elements identical to the elements illustrated in FIG. 1 are given like reference numerals, and the descriptions these elements are omitted.

The image forming system 100 serving as a processing system illustrated in FIG. 1 includes a plurality of post-processing apparatuses (e.g., the post-processing apparatus 1, the post-processing apparatus 2, and the post-processing apparatus 3) at the subsequent stage of the image forming apparatus 4. However, a processing system may include one post-processing apparatus, which is like an image forming system 101 of this modification. In this case, the ejection trays to be specified as ejection destinations of the recording medium not jammed via the control panel 44 include the ejection tray 11 and the ejection tray 14.

Figure 15A:
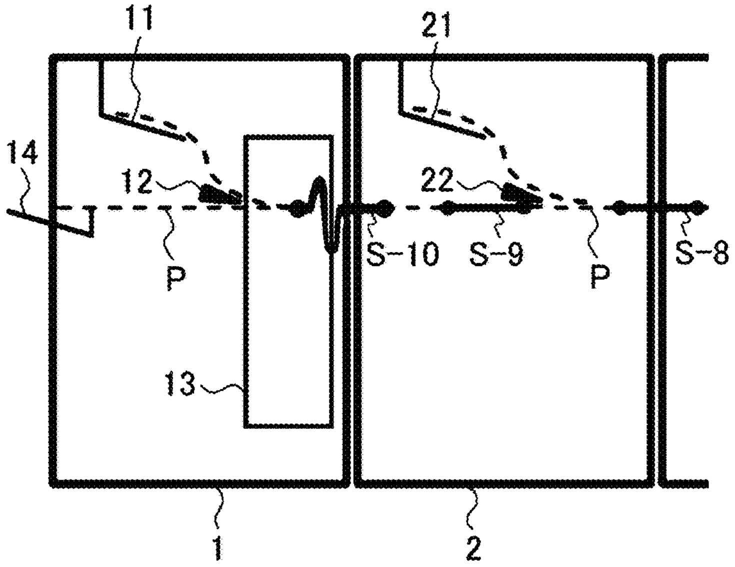
FIGS. 15A, 15B, and 15C are diagrams, each illustrating the ejection operation of the recording medium when a jam occurs, according to a modification of the above embodiments of the present disclosure.
Figure 15B:
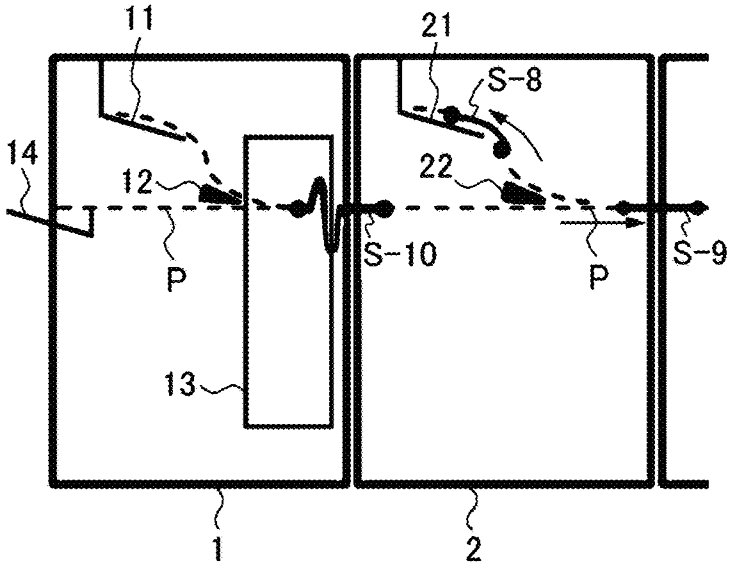
Figure 15C:
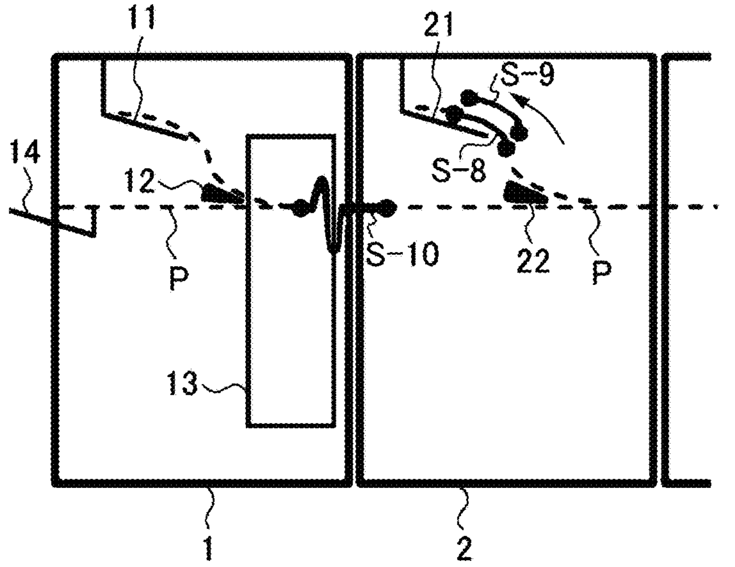

FIGS. 15A, 15B, and 15C are diagrams, each illustrating the ejection operation of the recording medium when a jam occurs, according to a modification of the above embodiments of the present disclosure.

In the above-described embodiments, the recording medium S that has passed the conveyance passage changing gate is ejected to the ejection tray downstream from the conveyance passage changing gate in the conveyance direction of the recording medium. By contrast, in this modification, the recording medium S that has once passed the conveyance passage changing gate is conveyed in a switchback manner and then ejected.

For example, when the recording medium S-10 is jammed at the inlet of the post-processing apparatus 1 as illustrated in FIG. 15A, the recording medium S-8 is ejected to the ejection tray 21 as illustrated in FIG. 15B, and the recording medium S-9 is conveyed upstream in the conveyance direction of the recording medium. When the recording medium S-9 is conveyed upstream from the conveyance passage changing gate 22, the recording medium S-9 is conveyed downstream in the conveyance direction of the recording medium again and is ejected to the ejection tray 21 as illustrated in FIG. 15C.

According to this modification, even when the jammed recording medium is downstream from the recording medium S-9 in the conveyance direction of the recording medium, the recording medium S-9 is not left stopped at the location but is ejected to the ejection tray 21.

As a result, the jam handling time in the image forming system is shortened, and the downtime (system stop time) is shortened.

Figure 16:
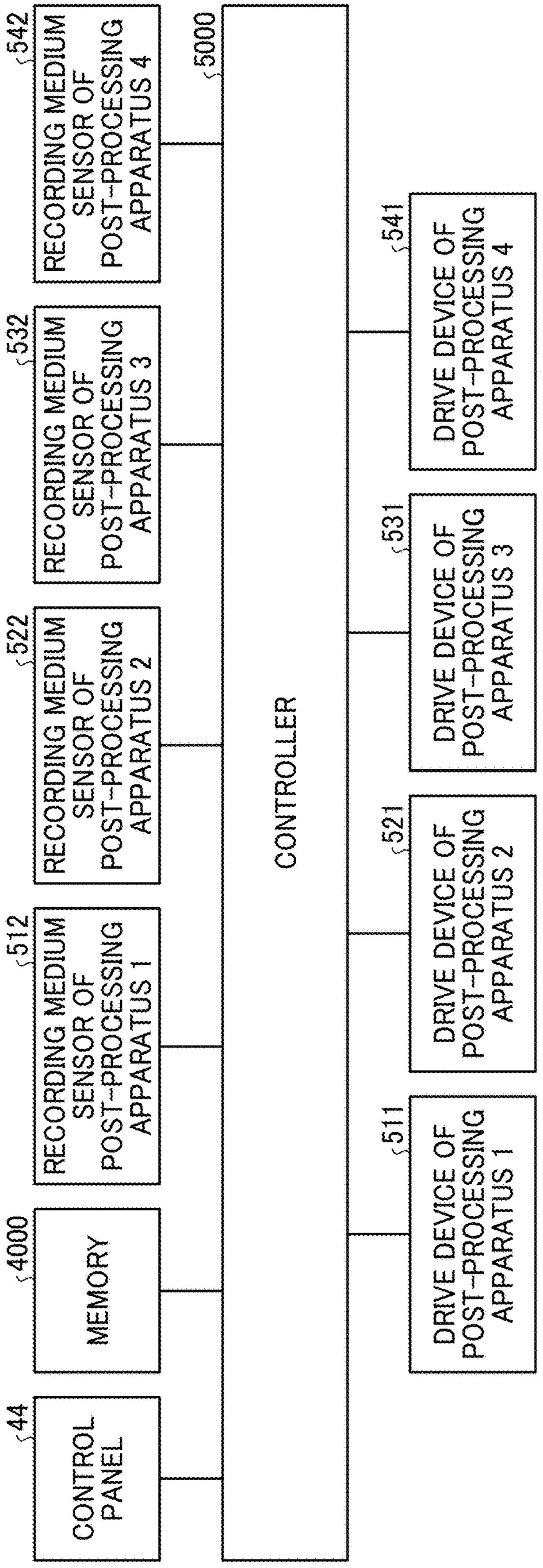
FIG. 16 is a schematic block diagram illustrating the processing system according to a modification of the above embodiments of the present disclosure.

FIG. 16 is a schematic block diagram illustrating the processing system according to a modification of the above embodiments of the present disclosure.

In FIG. 2, each of the image forming apparatus 4, the post-processing apparatus 1, the post-processing apparatus 2, and the post-processing apparatus 3 is provided with a controller. However, the image forming apparatus 4, the post-processing apparatus 1, the post-processing apparatus 2, and the post-processing apparatus 3 may share a common controller as illustrated in FIG. 16. In this modification, the image forming apparatus 4, the post-processing apparatus 1, the post-processing apparatus 2, and the post-processing apparatus 3 have a common controller 5000. The configuration of the common controller 5000 is similar to the configuration of the controllers 510, 520, 530, 540, and 550 illustrated in FIG. 3 and includes an ejection destination setting unit and a conveyance control unit. The controller 5000 includes a hardware configuration similar to the hardware configuration of the controllers 510, 520, 530, 540, and 550 as illustrated in FIG. 4.

Further, the memory may not be provided for each apparatus and may be provided as a common memory 4000. The common memory 4000 stores, for example, information of the post-processing apparatus 1, the post-processing apparatus 2, and the post-processing apparatus 3 and tray information in which ejection permission is settable in association with each other.

Figure 17:
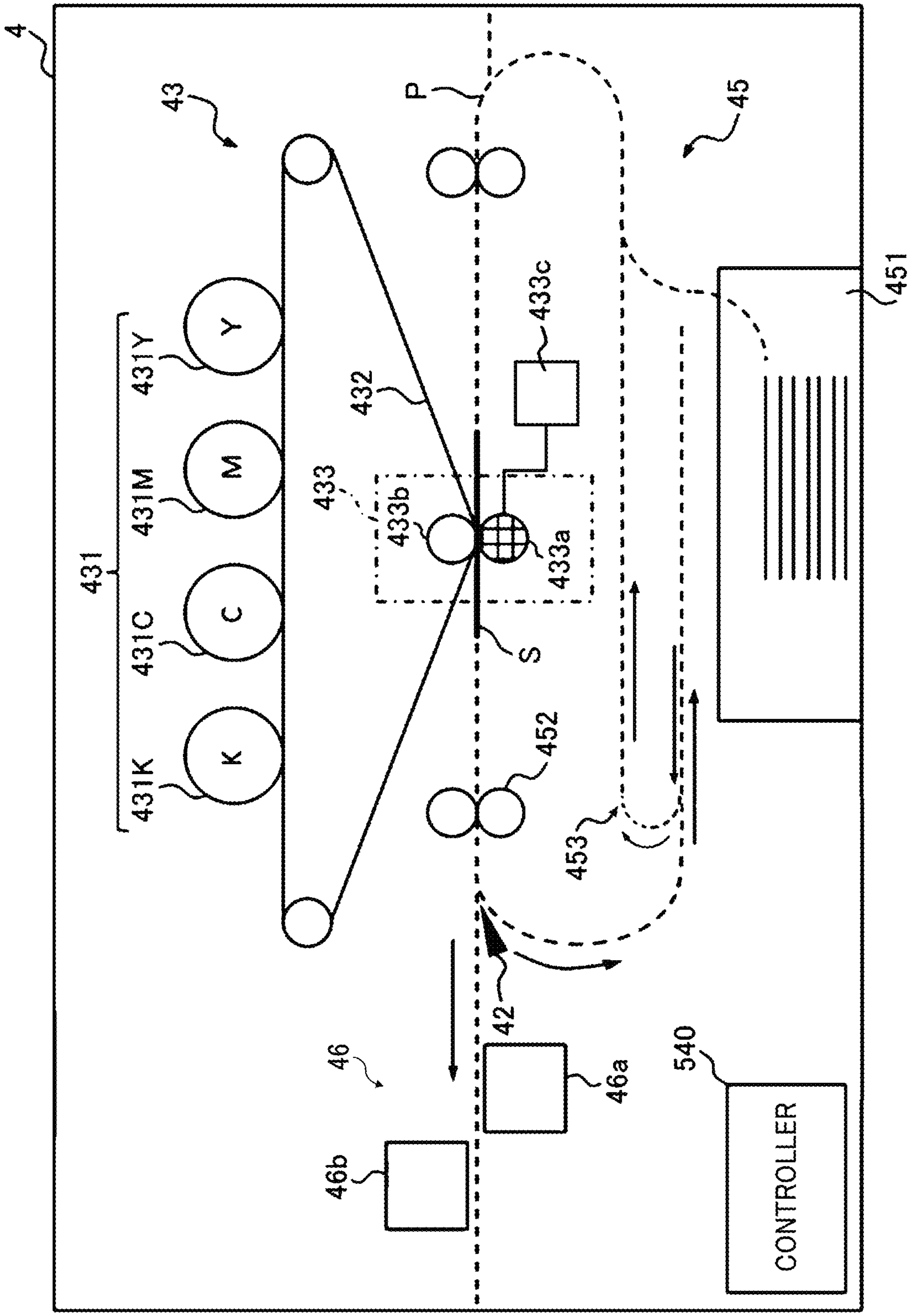
FIG. 17 is a schematic diagram illustrating an image forming apparatus according to an embodiment of the present disclosure.

FIG. 17 is a schematic diagram illustrating an image forming apparatus employing electrophotography, according to an embodiment of the present disclosure.

The image forming apparatus 4 includes the image forming device 43, a recording medium conveying device 45, an image reader 46 including image scanners 46*a* and 46*b*, and the controller 540. The controller 540 controls the overall operation of the image forming apparatus 4 and a series of processes and operations for forming an image on a recording medium S as a sheet-shaped recording medium. The image forming device 43 includes photoconductor drums 431 for forming latent images corresponding to images of respective colors. To be more specific, the photoconductor drums 431 are the photoconductor drums 431Y, 431M, 431C, and 431K disposed so as to correspond to an image forming process using toners of yellow (Y), magenta (M), cyan (C), and black (K), which are image forming materials (for example, toners) of the respective colors. The photoconductor drums 431Y, 431M, 431C, and 431K are disposed along an intermediate transfer belt 432 serving as an endless mover.

The intermediate transfer belt 432 is wound around at least one drive roller and a plurality of driven rollers, and moves between a primary transfer position at which the toner images developed on the photoconductor drums 431Y, 431M, 431C, and 431K are transferred onto the intermediate transfer belt 432 to form a composite toner image and a secondary transfer position where the composite toner image is transferred onto the recording medium S. A transfer device 433 is disposed at the secondary transfer position. The transfer device 433 includes a transfer roller 433*a*, a backup roller 433*b* disposed facing the transfer roller 433*a*, and a power source 433*c* for supplying a transfer current to the transfer roller 433*a*.

The transfer device 433 transfers a toner image from the intermediate transfer belt 432 onto the recording medium S to form an image at a predetermined position of the recording medium S. A gap is provided between the transfer roller 433*a* and the backup roller 433*b*, so that the intermediate transfer belt 432 and the recording medium S pass through the gap while being nipped between the transfer roller 433*a* and the backup roller 433*b*. The transfer device 433 conveys the recording medium S in the conveyance direction of the recording medium (sub-scanning direction) while nipping the recording medium S in this gap, and transfers the image onto the recording medium S.

The recording medium conveying device 45 includes a tray 451, a conveyance passage P, and a fixing roller 452. The tray 451 accommodates the recording medium S. The conveyance passage P is defined by a plurality of roller pairs that conveys the recording medium S. The fixing roller 452 is disposed downstream from the transfer device 433 in the conveyance direction of the recording medium. The recording medium conveying device 45 includes the conveyance passage changing gate 42 and a reversal passage 453. Note that the recording medium S is not limited to being supplied from the tray 451. As described in the embodiments above, in a case where the recording medium feeding apparatus 5 is disposed upstream from the image forming apparatus 4 in the conveyance direction of the recording medium, the recording medium S may be fed from the recording medium feeding apparatus 5 to the image forming apparatus 4.

In the execution of the image forming process, under the control of the predetermined control processing by the controller 540, the recording medium S accommodated on the tray 451 is separated from the rest of the recording media on the tray 451 and is conveyed along the conveyance passage P to reach the transfer device 433. When the recording medium S reaches the transfer device 433, the transfer device 433 executes the transfer process on the recording medium S. In other words, the transfer device 433 conveys the recording medium S in the predetermined conveyance direction of the recording medium while nipping the recording medium S between the transfer roller 433*a* and the surface of the intermediate transfer belt 432 that is biased toward the transfer roller 433*a* by the backup roller 433*b*. When the recording medium S passes between the intermediate transfer belt 432 and the transfer roller 433*a*, the toner image on the surface of the intermediate transfer belt 432 is transferred onto the recording medium S. Due to the transfer process, an image is formed on one face (first face) of the recording medium S.

After an image is formed on the first face of the recording medium S, the fixing roller 452 fixes the image to the recording medium S, and then the conveyance passage changing gate 42 moves the recording medium S toward the reversal passage 453. The recording medium S moved to the reversal passage 453 reverses the travel direction before entering the reversal passage 453. After the front and back sides of the recording medium S are reversed, the recording medium S moves into the reversal passage 453. Thereafter, the recording medium S is conveyed to the transfer position of the transfer roller 433*a* so that the image formed on the intermediate transfer belt 432 is transferred onto the second face of the recording medium S. After an image is formed on the second face of the recording medium S, the fixing roller 452 fixes the image to the recording medium S, and then the recording medium S moves toward the image scanners 46*a* and 46*b* of the image reader 46. The image scanner 46*a* of the image reader 46 reads the first face of the recording medium S. The image scanner 46*b* of the image reader 46 reads the second face of the recording medium S. Then, the image forming apparatus 4 ejects the recording medium S passed over the image scanner 46*a* and under the image scanner 46*b* to the outside of the housing of the image forming apparatus 4 or to the post-processing apparatus disposed at the subsequent stage of the image forming apparatus 4, in other words, to the post-processing apparatus downstream from the image forming apparatus 4 in the conveyance direction of the recording medium.

Note that, in the image forming apparatus 4 described in the present example, the transfer roller 433*a* of the transfer device 433 corresponds to the secondary transfer roller, and the secondary transfer current for the transfer roller 433*a* is turned off when jam occurs. In other words, when a recording medium is jammed, the controller 540 transmits an instruction to the power source 433*c* to cut off supply of transfer current to the transfer roller 433*a*. As a result, even if the recording medium S that is conveyance is continuously conveyed in the jam, the toner image is not transferred onto the recording medium S that passes the transfer position (transfer device 433).

In the above-described embodiment, the image forming system that forms an image on a sheet-shaped recording medium as an object is described as an example. However, the processing system according to the present disclosure is not limited to this configuration. The object may be a sheet-like recording medium or a plate-like recording medium. Further, the processing system may be, for example, a printing system or a painting system that prints a picture or pattern on a plate-shaped recording medium to create a building material used for a floor or a wall of a building.

In addition, the processing system may be an electrode manufacturing system that manufactures an electrode used for an electrochemical element such as a primary battery, a secondary battery, a capacitor, or a condenser. In this case, a sheet-like electrode substrate is conveyed as an object, and the liquid composition is discharged onto the electrode substrate using an inkjet method.

Further, when the image forming device 43 employs the inkjet image forming method, a liquid to be discharged from the recording head may include a solution, a suspension, or an emulsion that contains, e.g., a solvent such as water or an organic solvent, a colorant such as a dye or a pigment, a polymerizable compound, a functionalizing material such as a resin or a surface active agent, a biocompatible material such as a deoxyribonucleic acid (DNA), an amino acid, a protein, or a calcium, or an edible material such as a natural pigment. These liquids can be used for, e.g., inkjet ink, coating paint, surface treatment solution, a liquid for forming components of electronic element or light-emitting element or a resist pattern of electronic circuit, or a material solution for three-dimensional fabrication.

The above-described embodiment are given by way of example, and, for example, the following aspects of the present disclosure can provide the following advantages.

First Aspect

A processing system (for example, the image forming system 100) includes a processing apparatus (for example, the image forming apparatus 4), a feeding apparatus (for example, the recording medium feeding apparatus 5), an ejection apparatus (for example, the post-processing apparatus 1), and circuitry (for example, the ejection destination setting units 510A and 540A and the conveyance control units 510B and 540B). The processing apparatus includes a processing device (for example, the image forming device 43) to execute a desired process (for example, the image forming process) on each of objects (for example, the recording medium S, the recording media S). The objects include a first object and a second object traveling upstream or downstream from the first object in the conveyance direction of the objects. The feeding apparatus feeds the objects to the processing apparatus and is disposed upstream from the processing apparatus in the conveyance direction of the objects. The ejection apparatus ejects the objects sent from the processing apparatus and is disposed downstream from the processing apparatus in the conveyance direction of the objects. The ejection apparatus includes an ejection purge portion (for example, the ejection tray 11, 14) to receive the second object traveling in the ejection apparatus. The circuitry (for example, the ejection destination setting units 510A and 540A) sets whether to permit ejection of the second object being not jammed to the ejection purge portion in case of a jam of the first object in the processing system. The circuitry (the conveyance control units 510B and 540B) causes the second object to be ejected to the set ejection purge portion, in response to detection of the jam of the first object.

According to the first aspect, a processing system reduces the number of times for selecting the purge destination.

Second Aspect

According to the first aspect, the processing apparatus (for example, the image forming apparatus 4) further includes a processing purge portion (for example, the tray 41) to receive the second object (for example, the recording medium S) traveling in the processing apparatus.

Third Aspect

According to the first aspect or the second aspect, the processing system (for example, the image forming system 100) further includes a plurality of ejection apparatuses (for example, the post-processing apparatus 1, the post-processing apparatus 2, and the post-processing apparatus 3) including the ejection apparatus (for example, the post-processing apparatus 1). The plurality of ejection apparatuses are disposed downstream from the processing apparatus (for example, the image forming apparatus 4) in the conveyance direction and is coupled to the processing apparatus. The plurality of ejection apparatuses include respective ejection purge portions (for example, the ejection trays 11, 14, 21, 31) including the ejection purge portion (for example, the ejection trays 11, 14).

According to the second aspect and the third aspect, the ejection destination of the object is decentralized, and the ejection time is shortened.

Fourth Aspect

According to the first aspect, when the second object (for example, the recording media S-10, S-9, S-8, S-7 in FIG. 9) in the processing system is between a regular ejection portion (for example, the ejection tray 14) set as a regular ejection destination of the objects (for example, the recording medium S) and the first object (for example, the recording medium S-6 in FIG. 9) that is jammed upstream from the regular ejection portion in the conveyance direction, the circuitry (for example, the conveyance control units 510B and 540B) is to cause the second object to be ejected to the regular ejection portion.

Fifth Aspect

According to the fourth aspect, the first object (for example, the recording medium S 6 in FIG. 11) that is jammed upstream from the regular ejection portion (for example, the ejection tray 14) in the conveyance direction is in the processing apparatus (for example, the image forming apparatus 4).

Sixth Aspect

According to any one of the first aspect to the third aspect, when the second object (for example, the recording media S-10, S-9, S-8, S-7 in FIG. 9) in the processing system is between a regular ejection portion (for example, the ejection tray 14) set as a regular ejection destination of the objects (for example, the recording medium S) and the first object (for example, the recording medium S-6 in FIG. 9) that is jammed upstream from the regular ejection portion in the conveyance direction, the circuitry (for example, the conveyance control units 510B and 540B) is to cause the second object to be ejected to an extreme-downstream purge portion (for example, the ejection tray 11) among a plurality of ejection purge portions (for example, the ejection trays 11, 21, 31) specified by the circuitry (for example, the ejection destination setting units 510A, 520A, 530A, 540A) to eject the second object.

Seventh Aspect

According to the second aspect, when the first object (for example, the recording medium S-6 in FIG. 11) being jammed and the second object (for example, the recording media S-4, S-5 in FIG. 11) to be ejected to the processing purge portion (for example, the tray 41) are in the processing apparatus (for example, the image forming apparatus 4), the circuitry (for example, the conveyance control units 510B and 540B) is to cause the second object to be ejected to the processing purge portion.

Eighth Aspect

According to any one of the first aspect to the seventh aspect, the processing apparatus (for example, the image forming apparatus 4) includes a processing purge portion (for example, the tray 41) to receive the second object (for example, the recording medium S) traveling in the processing apparatus. When the second object (for example, the recording media S-1, S-2, S-3, S-4, S-5 in FIG. 8) is to be ejected to the ejection purge portion (for example, the ejection trays 11, 14, 21, 31) or the processing purge portion (tray 41) via the processing device (for example, the image forming device 43) of the processing apparatus (for example, the image forming apparatus 4), the circuitry (for example, the conveyance control units 5148 and 540B) is to prohibit the processing device from performing the process (for example, the image forming process) on the second object.

Ninth Aspect

According to the first aspect, when the second object (for example, the recording medium S-9 in FIG. 8) is not ejectable to the ejection purge portion (for example, the ejection trays 11, 14, 21, 31) specified by the circuitry (for example, the ejection destination setting units 510A, 520A, 530A, 540A) to eject the second object, the circuitry (for example, the conveyance control units 5108 and 540B) is to stop the second object at a current location of the second object.

Tenth Aspect

According to the first aspect, the processing apparatus (for example, the image forming apparatus 4) includes a processing purge portion (for example, the tray 41) to receive the second object (for example, the recording medium S) traveling in the processing apparatus. The circuitry (for example, the ejection destination setting units 510A, 520A, 530A, 540A) is to set permission and priority of the ejection of the second object to the ejection purge portion (for example, the ejection trays 11, 14, 21, 31) and the processing purge portion (for example, the tray 41).

Eleventh Aspect

According to the second aspect, the processing apparatus (for example, the image forming apparatus 4) includes an ejection destination changer (for example, the conveyance passage changing gate 42) to change between a first position to guide the second object (for example, the recording media S) to the ejection apparatus (for example, the post-processing apparatus 3) and a second position to guide the second object to the processing purge portion (for example, the tray 41).

Twelfth Aspect

According to the eleventh aspect, when the second object (for example, the recording media S-4. S-5 in FIG. K) in the processing apparatus (for example, the image forming apparatus 4) is at a location where the ejection destination changer (for example, the conveyance passage changing gate 42) is available to change an ejection destination of the second object, the circuitry is to cause the second object (for example, the recording media S 4, S-5 in FIG. 8) to be ejected to the processing purge portion (for example, the tray 41). When the second object (for example, the recording media S-1, S-2, S-3 in FIG. 8) is in the feeding apparatus (for example, the recording medium feeding apparatus 5), the circuitry is to cause the second object to be ejected to the processing purge portion. When the second object (for example, the recording medium S-6 in FIG. 8) in the processing apparatus is at a location where the ejection destination changer is not available to change the ejection destination, the circuitry is to cause the second object to be ejected to the ejection purge portion (ejection tray 21).

Thirteenth Aspect

According to the third aspect, the processing apparatus (for example, the image forming apparatus 4) includes a processing purge portion (for example, the tray 41) and an ejection destination changer (for example, the conveyance passage changing gate 42). The processing purge portion receives the second object (for example, the recording medium S) traveling in the processing apparatus. The ejection destination changer changes between a first position to guide the second object (for example, the recording media S-4, S-5, S-6 in FIG. 8) to the plurality of ejection apparatuses (for example, the post-processing apparatus 3) and a second position to guide the second object to the processing purge portion (for example, the tray 41). The second object (for example, the recording medium S-6 in FIG. 8) is at a location where the ejection destination changer is not available to change the election destination in the processing apparatus (for example, the image forming apparatus 4), the circuitry is to cause the second object to be ejected to an ejection purge portion (for example, the ejection tray 21) of an extreme-downstream ejection apparatus (for example, the post-processing apparatus 2) that is available to receive the second object, among the plurality of ejection apparatuses (for example, the post-processing apparatus 1, the post-processing apparatus 2, and the post-processing apparatus 3) specified to eject the second object.

According to any one of the fourth aspect to the thirteenth aspect, when the jam occurs, the object not jammed in the conveyance passage P is conveyed to an appropriate position and the number of remaining objects stopped in the processing system is reduced. As a result, the jam handling time is shortened.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. For example, the functions of the controllers 510, 520, 530, 540, 550, and 5000 can be implemented by one or more circuitries. Two or more controllers may be implemented by a single circuitry.

What is claimed is:

1. A processing system comprising:

a processing apparatus including a processing device to execute a process on each of objects, the objects including a first object and a second object traveling upstream or downstream from the first object in a conveyance direction of the objects;

a feeding apparatus to feed the objects to the processing apparatus, the feeding apparatus being disposed upstream from the processing apparatus in the conveyance direction of the objects;

an ejection apparatus to eject the objects sent from the processing apparatus, the ejection apparatus being disposed downstream from the processing apparatus in the conveyance direction of the objects, the ejection apparatus including a regular ejection destination and an ejection purge portion to receive the second object traveling in the ejection apparatus;

circuitry to:

determine whether the regular ejection destination is the ejection purge portion;

set whether to permit ejection of the second object being not jammed to the ejection purge portion in case of a jam of the first object in the processing system; and cause the second object to be ejected to the ejection purge portion, in response to detection of the jam of the first object, when the regular ejection destination and the ejection purge portion are different.

2. The processing system according to claim 1, wherein the processing apparatus includes a processing purge portion to receive the second object traveling in the processing apparatus.

3. The processing system according to claim 2, wherein, when the first object being jammed and the second object to be ejected to the processing purge portion are in the processing apparatus, the circuitry is to cause the second object to be ejected to the processing purge portion.

4. The processing system according to claim 2, wherein the processing apparatus includes an ejection destination changer to change between a first position to guide the second object to the ejection apparatus and a second position to guide the second object to the processing purge portion.

5. The processing system according to claim 4, wherein, when the second object in the processing apparatus is at a location where the ejection destination changer is available to change an ejection destination of the second object, the circuitry is to cause the second object to be ejected to the processing purge portion, wherein, when the second object is in the feeding apparatus, the circuitry is to cause the second object to be ejected to the processing purge portion, and wherein, when the second object in the processing apparatus is at a location where the ejection destination changer is not available to change the ejection destination, the circuitry is to cause the second object to be ejected to the ejection purge portion.

6. The processing system according to claim 1, further comprising a plurality of ejection apparatuses including the ejection apparatus, wherein the plurality of ejection apparatuses are disposed downstream from the processing apparatus and coupled to the processing apparatus, and wherein the plurality of ejection apparatuses include respective ejection purge portions including the ejection purge portion.

7. The processing system according to claim 6, wherein the processing apparatus includes:

a processing purge portion to receive the second object traveling in the processing apparatus; and an ejection destination changer to change between a first position to guide the second object to the plurality of ejection apparatuses and a second position to guide the second object to the processing purge portion, and wherein, when the second object is at a location where the ejection destination changer is not available to change the ejection destination in the processing apparatus, the circuitry is to cause the second object to be ejected to an ejection purge portion of an extreme-downstream ejection apparatus that is available to receive the second object, among the plurality of ejection apparatuses specified to eject the second object.

8. The processing system according to claim 1, wherein, when the second object in the processing system is between a regular ejection portion set as a regular ejection destination of the objects and the first object that is jammed upstream from the regular ejection portion in the conveyance direction, the circuitry is to cause the second object to be ejected to the regular ejection portion.

9. The processing system according to claim 8, wherein the first object that is jammed upstream from the regular ejection portion in the conveyance direction is in the processing apparatus.

10. The processing system according to claim 1, wherein, when the second object in the processing system is between a regular ejection portion set as a regular ejection destination of the objects and the first object that is jammed upstream from the regular ejection portion in the conveyance direction, the circuitry is to cause the second object to be ejected to an extreme-downstream ejection purge portion among a plurality of ejection purge portions specified by the circuitry to eject the second object.

11. The processing system according to claim 1, wherein the processing apparatus includes a processing purge portion to receive the second object traveling in the processing apparatus, and wherein, when the second object is to be ejected to the ejection purge portion or the processing purge portion via the processing device of the processing apparatus, the circuitry is to prohibit the processing device from performing the process on the second object.

12. The processing system according to claim 1, wherein, when the second object is not ejectable to the ejection purge portion specified to eject the second object, the circuitry is to stop the second object at a current location of the second object.

13. The processing system according to claim 1, wherein the processing apparatus includes a processing purge portion to receive the second object traveling in the processing apparatus, and wherein the circuitry is to set permission and priority of the ejection of the second object to the ejection purge portion and the processing purge portion.

14. The processing system according to claim 1, wherein each of the objects is a sheet-shaped recording medium.

15. The processing system according to claim 1, wherein the processing apparatus is an image forming apparatus to form an image on each of the objects.

16. The processing system according to claim 1, wherein: when it is determined that the regular ejection destination is the ejection purge portion and the first object is jammed and the second object is not jammed, ejecting the second object to an extreme downstream tray.

* * * * *